United States Patent
Pepper et al.

(10) Patent No.: US 8,617,686 B2
(45) Date of Patent: Dec. 31, 2013

(54) CARPET, CARPET BACKING AND METHOD FOR MAKING SAME USING OLEFIN BLOCK COPOLYMERS

(75) Inventors: Randy E. Pepper, Katy, TX (US); David J. Magley, Midland, MI (US); Ronald Wevers, Terneuzen (NL); Harold C. Fowler, Midland, MI (US); Selim Yalvac, Pearland, TX (US); Colin Lipishan, Pearland, TX (US); Ronald J. Weeks, Lake Jackson, TX (US); Yi Jin, Missouri City, TX (US)

(73) Assignee: Dow Global Technologies LLC, Midland, MI (US)

( * ) Notice: Subject to any disclaimer, the term of this patent is extended or adjusted under 35 U.S.C. 154(b) by 505 days.

(21) Appl. No.: 12/809,660

(22) PCT Filed: Dec. 19, 2008

(86) PCT No.: PCT/US2008/087662
§ 371 (c)(1),
(2), (4) Date: Jun. 21, 2010

(87) PCT Pub. No.: WO2009/086091
PCT Pub. Date: Jul. 9, 2009

(65) Prior Publication Data
US 2010/0272946 A1  Oct. 28, 2010

Related U.S. Application Data

(60) Provisional application No. 61/015,810, filed on Dec. 21, 2007.

(51) Int. Cl.
*D05C 17/02* (2006.01)
*B32B 33/00* (2006.01)

(52) U.S. Cl.
USPC ............................................. 428/97; 428/95

(58) Field of Classification Search
USPC ........................................ 428/97, 95; 156/72
See application file for complete search history.

(56) References Cited

U.S. PATENT DOCUMENTS

| 3,390,035 A | 6/1968 | Sands |
| 3,551,231 A | 12/1970 | Smedberg |

(Continued)

FOREIGN PATENT DOCUMENTS

| GB | 2072578 A | 10/1981 |
| WO | 93/15909 A1 | 8/1993 |

(Continued)

OTHER PUBLICATIONS

US file history for U.S. Appl. No. 12/499,667, Jun. 14, 2012.

(Continued)

*Primary Examiner* — Cheryl Juska
(74) *Attorney, Agent, or Firm* — Whyte Hirschboeck Dudek S.C.

(57) ABSTRACT

A carpet includes (a) a primary backing which has a face and a back surface, (b) a plurality of fibers attached to the primary backing and extending from the face of the primary backing and exposed at the back surface of the primary backing, (c) an adhesive backing, (d) an optional secondary backing adjacent to the adhesive backing, and (e) at least one olefin block copolymer, especially ethylene based block copolymers An olefin block copolymer is extrusion coated onto the back surface of a primary backing to provide an adhesive backing Additional steps and procedures can include washing or scouring the primary backing and fibers prior to the extrusion step, and utilizing implosion agents The preferred olefin block copolymer is an ethylene based block interpolymers The constructions and methods are suited for making tufted, broad-loom carpet having improved abrasion resistance.

12 Claims, 7 Drawing Sheets

(56) References Cited

U.S. PATENT DOCUMENTS

| | | | |
|---|---|---|---|
| 3,583,936 A | 6/1971 | Stahl | |
| 3,684,600 A | 8/1972 | Smedberg | |
| 3,745,054 A | 7/1973 | Smedberg | |
| 3,914,489 A | 10/1975 | Smedberg | |
| 6,180,709 B1 * | 1/2001 | Nishio et al. | 524/451 |
| 7,160,949 B2 * | 1/2007 | Ota et al. | 525/242 |
| 7,353,089 B1 * | 4/2008 | McEvoy | 701/2 |
| 7,524,911 B2 * | 4/2009 | Karjala et al. | 526/348 |
| 7,732,052 B2 * | 6/2010 | Chang et al. | 428/424.8 |
| 7,737,215 B2 * | 6/2010 | Chang et al. | 525/88 |
| 7,757,061 B2 * | 7/2010 | Janzen et al. | 711/167 |
| 7,803,862 B2 * | 9/2010 | Kanada et al. | 524/444 |
| 7,910,658 B2 * | 3/2011 | Chang et al. | 525/191 |
| 7,947,776 B2 * | 5/2011 | Moncla et al. | 524/523 |
| 7,989,543 B2 * | 8/2011 | Karjala et al. | 524/543 |
| 8,043,713 B2 * | 10/2011 | Wevers et al. | 428/523 |
| 8,124,234 B2 * | 2/2012 | Weaver et al. | 428/423.1 |
| 8,288,470 B2 * | 10/2012 | Ansems et al. | 524/576 |
| 2002/0134486 A1 * | 9/2002 | Brumbelow et al. | 156/79 |
| 2003/0055179 A1 * | 3/2003 | Ota et al. | 525/242 |
| 2004/0079467 A1 * | 4/2004 | Brumbelow et al. | 156/72 |
| 2004/0202817 A1 * | 10/2004 | Brumbelow et al. | 428/95 |
| 2005/0266206 A1 | 12/2005 | Bieser et al. | |
| 2006/0134374 A1 | 6/2006 | Bell et al. | |
| 2006/0199897 A1 * | 9/2006 | Karjala et al. | 524/543 |
| 2006/0199907 A1 * | 9/2006 | Chang et al. | 525/191 |
| 2007/0078222 A1 * | 4/2007 | Chang et al. | 525/88 |
| 2007/0095453 A1 | 5/2007 | Brumbelow et al. | |
| 2007/0155900 A1 | 7/2007 | Chang et al. | |
| 2007/0160833 A1 | 7/2007 | Maak et al. | |
| 2007/0254131 A1 | 11/2007 | Shail et al. | |
| 2007/0292705 A1 * | 12/2007 | Moncla et al. | 428/523 |
| 2008/0009586 A1 * | 1/2008 | VanSumeren et al. | 525/88 |
| 2008/0177242 A1 * | 7/2008 | Chang et al. | 604/385.01 |
| 2008/0234435 A1 * | 9/2008 | Chang et al. | 525/240 |
| 2008/0280093 A1 * | 11/2008 | Bieser et al. | 428/90 |
| 2008/0280517 A1 * | 11/2008 | Chang et al. | 442/104 |
| 2008/0281037 A1 * | 11/2008 | Karjala et al. | 524/571 |
| 2008/0292833 A1 * | 11/2008 | Wevers et al. | 428/96 |
| 2009/0118426 A1 * | 5/2009 | Mitani et al. | 525/95 |
| 2009/0172970 A1 * | 7/2009 | Prieto et al. | 36/71 |
| 2010/0029827 A1 * | 2/2010 | Ansems et al. | 524/451 |
| 2010/0062209 A1 * | 3/2010 | Wevers et al. | 428/95 |
| 2010/0255207 A1 * | 10/2010 | Neubauer et al. | 427/389.9 |
| 2010/0292403 A1 * | 11/2010 | Ansems et al. | 525/125 |
| 2010/0310858 A1 * | 12/2010 | Wevers et al. | 428/327 |
| 2011/0008567 A1 * | 1/2011 | Weeks et al. | 428/95 |
| 2011/0081529 A1 * | 4/2011 | Richeson et al. | 428/212 |
| 2011/0187018 A1 * | 8/2011 | Peng et al. | 264/211.12 |
| 2011/0262747 A1 * | 10/2011 | Yalvac et al. | 428/355 EN |
| 2012/0325403 A1 * | 12/2012 | Chereau et al. | 156/285 |
| 2013/0030123 A1 * | 1/2013 | Martin et al. | 525/95 |
| 2013/0048204 A1 * | 2/2013 | Chang et al. | 156/244.11 |
| 2013/0059989 A1 * | 3/2013 | Ansems et al. | 525/92 C |

FOREIGN PATENT DOCUMENTS

| | | | |
|---|---|---|---|
| WO | | 2005/090425 A1 | 9/2005 |
| WO | | 2005/090426 A1 | 9/2005 |
| WO | | 2005/090427 A2 | 9/2005 |
| WO | WO 2007008558 A2 * | | 1/2007 |
| WO | WO 2008005501 A2 * | | 1/2008 |

OTHER PUBLICATIONS

PCT/US2008/087662 International Preliminary Report on Patentability, Jun. 22, 2010.

PCT/US2008/087662 International Search Report and Written Opinion, Feb. 27, 2009.

* cited by examiner

Growth tension curves in MD

Growth tension curves in CD

CARPET, CARPET BACKING AND METHOD FOR MAKING SAME USING OLEFIN BLOCK COPOLYMERS

CROSS-REFERENCE TO RELATED APPLICATIONS

This application claims priority from U.S. provisional patent application Ser. No. 61/015,810 filed Dec. 21, 2007, hereby incorporated by reference in its entirety.

BACKGROUND OF THE INVENTION

This invention relates to carpets, carpet backing and a method of making carpet and carpet backing. While there have been many attempts to bind carpet fibers together using various polymers, such as polyethylene and polypropylene, there continues to be a need for a polymer based system that is both easily applied and still maintains enough flexibility while at the same time minimizing "growth," especially at elevated temperatures.

BRIEF SUMMARY OF THE INVENTION

The invention provides a carpet or carpet tile composition comprising at least one ethylene/α-olefin block interpolymer, comprising hard blocks and soft blocks, wherein the ethylene/α-olefin block interpolymer is characterized by a molecular weight distribution, Mw/Mn, in the range of from about 1.4 to about 2.8 and:

(a) has at least one melting point, Tm, in degrees Celsius, and a density, d, in grams/cubic centimeter, wherein the numerical values of Tm and d correspond to the relationship:

$$Tm > -6553.3 + 13735(d) - 7051.7(d)^2, \text{ or}$$

(b) is characterized by a heat of fusion, ΔH in J/g, and a delta quantity, ΔT, in degrees Celsius, defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1; or (f) is characterized by an average block index greater than zero and up to about 1.0; and, preferably wherein the ethylene/α-olefin block interpolymer is mesophase separated.

In addition, the invention provides a carpet or carpet tile comprising an ethylene/α-olefin block copolymer wherein the copolymer is characterized by an average molecular weight of greater than 40,000 g/mol, a molecular weight distribution, Mw/Mn, in the range of from about 1.4 to about 2.8, and a difference in mole percent α-olefin content between the soft block and the hard block of greater than about 20 mole percent.

Another aspect of the invention is a carpet or carpet tile comprising a cap coat material or an adhesive backing material, which further comprises (a) at least one filler in an amount of greater than 0% and up to about 90% by weight based on the total weight of the material, wherein the filler is selected form the group consisting of coal fly ash, ATH, $CaCO_3$, talc, recycled glass, magnesium hydroxide, ground up tires, and ground up carpet, (b) optionally, at least one other polymer selected from the group consisting of MAH-g-HDPE, EEA, and EAA (c) optionally, at least one oil, such as Chevron XYZ, Sunpar 150

(d) optionally a color additive such as carbon black, and (e) from 0 to about 15 weight percent of at least one tackifier such as Estotac H115R.

Still another aspect of the invention is a carpet tile comprising an ethylene block copolymer, which further comprises at least one filler, and has a radiant panel flame propagation of a minimum of 0.4 watts/square centimeter tested in accordance with ASTM E 648.

DETAILED DESCRIPTION OF THE INVENTION

This invention relates to carpets and methods of making carpets, wherein, for each, the carpets comprise at least one flexible ethylene polymer backing material. In a particular instance, the invention relates to a carpet and a method of making a carpet by an extrusion coating technique, wherein for each the carpet comprises a backing material comprised of at least one olefin block copolymer, especially ethylene based block copolymers.

The present invention pertains to any carpet constructed with a primary backing material and includes tufted carpet and non-tufted carpet such as needle punched carpet. Although specific embodiments are amenable to tufted and non-tufted carpet, tufted carpet is preferred.

The carpet backing formulations, especially those using ethylene block copolymers, have improved sustainability together with higher filler loadings.

The precoat backing material, the adhesive backing material or the cap coat backing material can comprise at least one olefin block copolymer.

The precoat can comprise olefin block copolymer applied as a polyolefin dispersion, as a hot melt adhesive polyolefin dispersion, as a hot melt adhesive, as a powder coating., as an extrusion coating, whether applied as a single layer or multilayer extrusion.

The adhesive layer comprising olefin block copolymer can be applied as an extrusion coating, whether applied as a single layer or multilayer extrusion, or as a hot melt.

The cap coat or secondary backing layer comprising olefin block copolymer is applied as an extrusion coating, whether applied as a single layer or multilayer extrusion, or as a hot melt.

Figure 1:
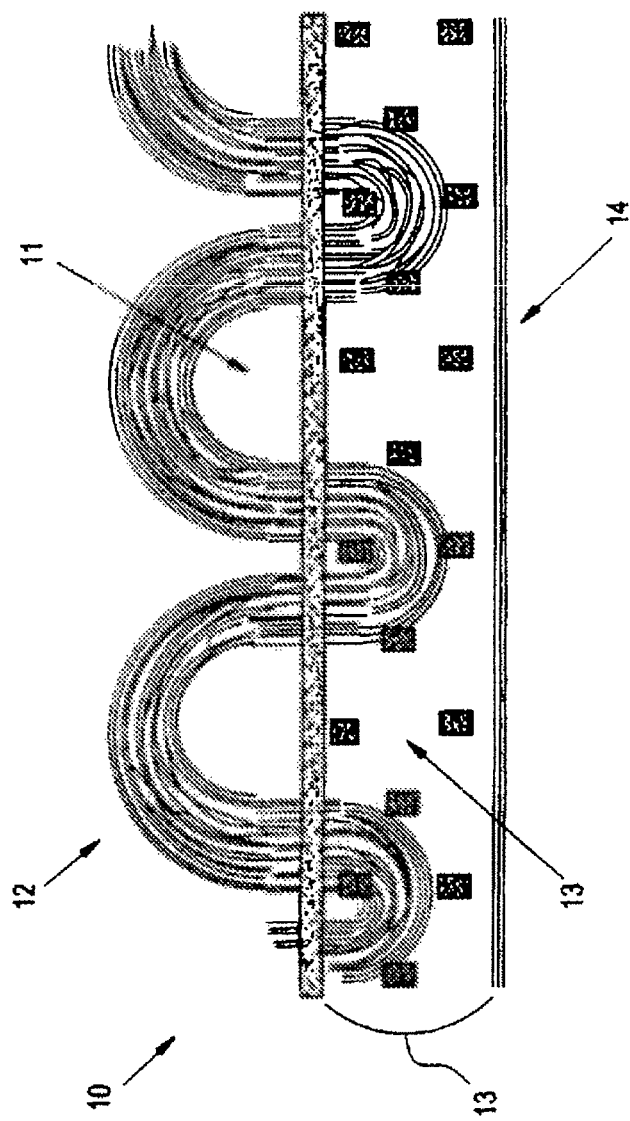
FIG. 1 is an illustration of a tufted carpet 10.

As illustrated in FIG. 1, tufted carpets are composite structures which include yarn (which is also known as a fiber bundle), a primary backing material having a face surface and a back surface, an adhesive backing material and, optionally, a secondary backing material. To form the face surface of tufted carpet, yarn is tufted through the primary backing material such that the longer length of each stitch extends through the face surface of the primary backing material. Typically, the primary backing material is made of a woven or non-woven material such as a thermoplastic polymer, most commonly polypropylene or polyester.

The face of a tufted carpet can generally be made in three ways. First, for loop pile carpet, the yarn loops formed in the tufting process are left intact. Second, for cut pile carpet, the yarn loops are cut, either during tufting or after, to produce a pile of single yarn ends instead of loops. Third, some carpet styles include both loop and cut pile. One variety of this hybrid is referred to as tip-sheared carpet where loops of differing lengths are tufted followed by shearing the carpet at a height so as to produce a mix of uncut, partially cut, and completely cut loops. Alternatively, the tufting machine can be configured so as to cut only some of the loops, thereby leaving a pattern of cut and uncut loops. Whether loop, cut, or a hybrid, the yarn on the back side of the primary backing material comprises tight, unextended loops.

The combination of tufted yarn and a primary backing material without the application of an adhesive backing material or secondary backing material is referred to in the carpet industry as raw tufted carpet or greige goods.

Greige goods become finished tufted carpet with the application of an adhesive backing material and an optional secondary backing material to the back side of the primary backing material. Finished tufted carpet can be prepared as broadloomed carpet in rolls typically 6 or 12 feet wide.

Alternatively, carpet can be prepared as carpet tiles, typically 18 inches square in the United States and 50 cm. square elsewhere.

The adhesive backing material is applied to the back face of the primary backing material to affix the yarn to the primary backing material. Typically, the adhesive backing material is applied by a pan applicator using a roller, a roll over a roller or a bed, or a knife (also called a doctor blade) over a roller or a bed. Properly applied adhesive backing materials do not substantially pass through the primary backing material.

Most frequently, the adhesive backing material is applied as a single coating or layer. The extent or tenacity to which the yarn is affixed is referred to as tuft lock or tuft bind strength. Carpets with sufficient tuft bind strength exhibit good wear resistance and, as such, have long service lives. Also, the adhesive backing material should substantially penetrate the yarn (fiber bundle) exposed on the backside of the primary backing material and should substantially consolidate individual fibers within the yarn.

Good penetration of the yarn and consolidation of fibers yields good abrasion resistance. Moreover, in addition to good tuft bind strength and abrasion resistance, the adhesive material should also impart or allow good flexibility to the carpet in order to facilitate easy installation of the carpet. The secondary backing material is typically a lightweight scrim made of woven or non-woven material such as a thermoplastic polymer, most commonly polypropylene. The secondary backing material is optionally applied to the backside of the carpet onto the adhesive backing material, primarily to provide enhanced dimensional stability to the carpet structure as well as to provide more surface area for the application of direct glue-down adhesives.

Alternative backing materials may also be applied to the backside of the adhesive backing material and/or to the backside of the secondary backing material, if present.

Alternative backing materials may include foam cushioning (e.g. foamed polyurethane) and pressure sensitive floor adhesives. Alternative backing materials may also be applied, for example, as webbing with enhanced surface area, to facilitate direct glue-down adhesive installations (e.g., in contract commercial carpeting, automobile carpet and airplane carpet where the need for cushioning is often minimal). Alternative backing materials can also be optionally applied to enhance barrier protection respecting moisture, insects, and foodstuffs as well as to provide or enhance fire suppression, thermal insulation, and sound dampening properties of the carpet.

Known adhesive backing materials include curable latex, urethane or vinyl systems, with latex systems being most common. Conventional latex systems are low viscosity, aqueous compositions that are applied at high carpet production rates and offer good fiber-to-backing adhesion, tuft bind strength and adequate flexibility. Generally, excess water is driven off and the latex is cured by passing through a drying oven. Styrene butadiene rubbers (SBR) are the most common polymers used for latex adhesive backing materials. Typically, the latex backing system is heavily filled with an inorganic filler such as calcium carbonate or Aluminum Trihydrate and includes other ingredients such as antioxidants, antimicrobials, flame retardants, smoke suppressants, wetting agents, and froth aids.

Conventional latex adhesive backing systems can have certain drawbacks. As one important drawback, typical latex adhesive backing systems do not provide a moisture barrier. Another possible drawback, particularly with a carpet having polypropylene yarn and polypropylene primary and secondary backing materials, is the dissimilar polymer of latex systems along with the inorganic filler can reduce the recyclability of the carpet.

In view of these drawbacks, some in the carpet industry have begun seeking suitable replacements for conventional latex adhesive backing systems. One alternative is the use of urethane adhesive backing systems. In addition to providing adequate adhesion to consolidate the carpet, urethane backings generally exhibit good flexibility and barrier properties and, when foamed, can eliminate the need for separate underlayment padding (i.e., can constitute a direct glue-down unitary backing system). However, urethane backing systems also have important drawbacks, including their relatively high cost and demanding curing requirements which necessitate application at slow carpet production rates relative to latex systems.

Thermoplastic polyolefins such as ethylene vinyl acetate (EVA) copolymers and low density polyethylene (LDPE) have also been suggested as adhesive backing materials due in part to their low cost, good moisture stability and no-cure requirements. Various methods are available for applying polyolefin backing materials, including powder coating, hot melt application and extruded film or sheet lamination.

However, using polyolefins to replace latex adhesive backings can also present difficulties. For example, U.S. Pat. 5,240,530, Table A at Col. 10, indicates that ordinary polyolefin resins possess inadequate adhesion for use in carpet construction. Additionally, relative to latex and other cured systems, ordinary polyolefins have relatively high application viscosities and relatively high thermal requirements. That is, ordinary thermoplastic polyolefins are characterized by relatively high melt viscosities and high recrystallization or solidification temperatures relative to the typical aqueous viscosities and cure temperature requirements characteristic of latex and other cured (thermosetting) systems.

Even ordinary elastomeric polyolefins, i.e. polyolefins having low crystallinities, generally have relatively high viscosities and relatively high recrystallization temperatures. High recrystallization temperatures result in relatively short molten times during processing and, combined with high melt viscosities can make it difficult to achieve adequate penetration of the yarn, especially at conventional adhesive backing application rates. One method for overcoming the viscosity and recrystallization deficiencies of ordinary polyolefins is to formulate the polyolefin resin as a hot melt adhesive which usually involves formulating low molecular weight polyolefins with waxes, tackifiers, various flow modifiers and/or other elastomeric materials. Ethylene/vinyl acetate (EVA) copolymers, for example, have been used in formulated hot melt adhesive backing compositions, and other polyolefins compositions have also been proposed as hot melt backing compositions. For example, in U.S. Pat. No. 3,982,051, Taft et al. disclose that a composition comprising an ethylene/vinyl acetate copolymer, atactic polypropylene and vulcanized rubber is useful as a hot melt carpet backing adhesive.

Unfortunately, hot melt adhesive systems are generally considered not completely suitable replacements for conventional latex adhesive backings. Typical hot melt systems based on EVA and other copolymers of ethylene and unsaturated comonomers can require considerable formulating and yet often yield inadequate tuft bind strengths. However, the most significant deficiency of typical hot melt system is their melt strengths which are generally too low to permit application by a direct extrusion coating technique. As such, polyolefin hot melt systems are typically applied to primary backings by relatively slow, less efficient techniques such as by the use of heated doctor blades or rotating melt transfer rollers.

While unformulated high pressure low density polyethylene (LDPE) can be applied by a conventional extrusion coating technique, LDPE resins typically have poor flexibility which can result in excessive carpet stiffness.

Conversely, those ordinary polyolefins that have improved flexibility, such as ultra low density polyethylene (ULDPE) and ethylene/propylene interpolymers, still do not possess sufficient flexibility, have excessively low melt strengths and/or tend to draw resonate during extrusion coating. To overcome extrusion coating difficulties, ordinary polyolefins with sufficient flexibility can be applied by lamination techniques to insure adequate yarn-to-backing adhesion; however, lamination techniques are typically expensive and can result in extended production rates relative to direct extrusion coating techniques.

Known examples of flexible polyolefin backing materials are disclosed in U.S. Pat. Nos. 3,390,035; 3,583,936; 3,745,054; and 3,914,489. In general, these disclosures describe hot melt adhesive backing compositions based on an ethylene copolymer, such as, ethylene/vinyl acetate (EVA), and waxes. Known techniques for enhancing the penetration of hot melt adhesive backing compositions through the yarn include applying pressure while the greige good is in contact with rotating melt transfer rollers as described, for example, in U.S. Pat. No. 3,551,231.

Another known technique for enhancing the effectiveness of hot melt systems involve using pre-coat systems. For example, U.S. Pat. Nos. 3,684,600; 3,583,936; and 3,745,054, describe the application of low viscosity aqueous pre-coats to the back surface of the primary backing material prior the application of a hot melt adhesive composition.

The hot melt adhesive backing systems disclosed in these patents are derived from multi-component formulations based on functional ethylene polymers such as, for example, ethylene/ethyl acrylate (EEA) and ethylene/vinyl acetate (EVA) copolymers.

Although there are various systems known in the art of carpet backings, there remains a need for a thermoplastic polyolefin carpet backing system which provides adequate tuft bind strength, good abrasion resistance and good flexibility to replace cured latex backing systems. A need also remains for an application method which permits high carpet production rates while achieving the desired characteristics of good tuft bind strength, abrasion resistance, barrier properties and flexibility. Finally, there is also a need to provide a carpet structure having fibers and backing materials that are easily recyclable without the necessity of extensive handling and segregation of carpet component materials. In accordance with one aspect of the present invention, a carpet comprises a plurality of fibers, a primary backing material having a face and a back side, an adhesive backing material and an optional secondary backing material, the plurality of fibers attached to the primary backing material and protruding from the face of the primary backing material and exposed on the back side of the primary backing material, the adhesive backing material disposed on the back side of the primary backing material and the optional secondary backing material adjacent to the adhesive backing material, wherein at least one of the plurality of fibers, the primary backing material, the adhesive backing material or the optional secondary backing material is comprised of at least one olefin block copolymer. Another aspect of the present invention is a method of making a carpet, the carpet including a plurality of fibers, a primary backing material having a face and a back side, an adhesive backing material and an optional secondary backing material, the plurality of fibers attached to the primary backing material and protruding from the face of the primary backing material and exposed on the back side of the primary backing material, the method comprising the step of extrusion coating the adhesive backing material or the optional secondary backing material onto the back side of the primary backing material, wherein the extrusion coated adhesive backing material or optional secondary backing material is comprised of at least one olefin block copolymer, especially ethylene based block interpolymers characterized as wherein the interpolymer is characterized by an average block index greater than zero and up to about 1.0 and a molecular weight distribution, $M_w/M_n$, greater than about 1.3. In another aspect, the invention relates to an ethylene/α-olefin interpolymer comprising polymerized units of ethylene and α-olefin, wherein the average block index is greater than 0 but less than about 0.4 and a molecular weight distribution, $M_w/M_n$, greater than about 1.3. Preferably, the interpolymer is a linear, multi-block copolymer with at least three blocks. Also preferably, the ethylene content in the interpolymer is at least 50 mole percent. In addition, the ethylene based block copolymers can be ethylene/alpha-olefin interpolymers, wherein the ethylene/α-olefin interpolymer has at least one or more of the following characteristics:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to } 130 \text{ J/g,}$$

$$\Delta T \geq 48° \text{ C. for } \Delta H \text{ greater than } 130 \text{ J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is substantially free of a cross-linked phase:

$$Re > 1481 \times 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or (e) is characterized by a storage modulus at 25° C., G'(25° C.), and a storage modulus at 100° C., G'(100° C.), wherein the ratio of G'(25° C.) to G'(100° C.) is from about 1:1 to about 10:1 and, preferably, wherein the ethylene/α-olefin block interpolymer is mesophase separated.

As used herein, "mesophase separation" means a process in which polymeric blocks are locally segregated to form ordered domains. Crystallization of the ethylene segments in these systems is primarily constrained to the resulting mesodomains and such systems may be referred to as "mesophase separated". These mesodomains can take the form of spheres, cylinders, lamellae, or other morphologies known for block copolymers. The narrowest dimension of a domain, such as perpendicular to the plane of lamellae, is generally greater than about 40 nm in the mesophase separated block copolymers of the instant invention.

The ethylene/α-olefin interpolymers of the invention may be characterized as mesophase separated. Domain sizes are typically in the range of from about 40 nm to about 300 nm, preferably in the range of from about 50 nm to about 250 nm, and more preferably in the range of from about 60 nm to about 200 nm, as measured by the smallest dimension such as perpendicular to the plane of lamellae or the diameter of spheres or cylinders. In addition, domains may have smallest dimensions that are greater than about 60 nm, greater than about 100 nm, and greater than about 150 nm. Domains may be characterized as cylinders, spheres, lamellae, or other morphologies known for block copolymers. The mesophase separated polymers comprise olefin block copolymers wherein the amount of comonomer in the soft segments as compared to that in the hard segments is such that the block copolymer undergoes mesophase separation in the melt. The required amount of comonomer may be measured in mole percent and varies with each comonomer. A calculation may be made for any desired comonomer in order to determine the amount required to achieve mesophase separation. The minimum level of incompatibility, expressed as χN, to achieve mesophase separation in these polydisperse block copolymers is predicted to be χN=2.0 (I. I. Potemkin, S. V. Panyukov, Phys. Rev. E. 57, 6902 (1998)). Recognizing that fluctuations usually push the order-disorder transition in commercial block copolymers to slightly higher χN, a value χN=2.34 has been used as the minimum in the calculations below. Following the approach of D. J. Lohse, W. W. Graessley, Polymer Blends Volume 1: Formulation, ed. D. R. Paul, C. B. Bucknall, 2000, χN can be converted to the product of χ/v and M/ρ where v is a reference volume, M is the number average block molecular weight and ρ is the melt density. The melt density is taken to be 0.78 g/cm3 and a typical value of block molecular weight is approximately 25,500 g/mol based on a diblock at an overall molecular weight of 51,000 g/mol. χ/v for cases in which the comonomer is butene or propylene is determined using 130° C. as the temperature and then performing an interpolation or extrapolation of the data provided in Table 8.1 in the reference by Lohse and Graessley. For each comonomer type, a linear regression in mole percent comonomer was performed. For cases in which octene is the comonomer, the same procedure was performed with the data of Reichart, G. C. et al, Macromolecules (1998), 31, 7886. The entanglement molecular weight at 413 K (about 140° C.) in kg/mol is taken to be 1.1. Using these parameters, the minimum difference in comonomer content is determined to be, respectively, 20.0, 30.8 or 40.7 mole percent when the comonomer is octene, butene, or propylene. When the comonomer is 1-octene, the difference in mole percent octene between the hard segment and the soft segment, Δ octene, is greater than or equal to about 20.0 mole percent, more preferably greater than or equal to about 22 mole percent and may also be greater than or equal to about 23 mole percent, greater than or equal to 24 mole percent, greater than about or equal to 25 mole percent and greater than about or equal to 26 mole percent. In addition, the Δ octene value may be in the range of from about 20.0 mole percent to about 60 mole percent and more preferably in the range of from about 22 mole percent to about 45 mole percent. When the comonomer is 1-butene, the difference in mole percent butene between the hard segment and the soft segment, Δ butene, is greater than or equal to about 30.8 mole percent, more preferably greater than or equal to about 33.9 mole percent and may also be greater than or equal to about 35.4 mole percent, greater than or equal to 36.9 mole percent, greater than or equal to about 38.5 mole percent and greater than or equal to about 40.0. In addition, the Δ butene value may be in the range of from about 30.8 mole percent to about 80 mole percent, preferably in the range of from about 33.9 mole percent to about 60 mole percent, preferably in the range of from about 36 mole percent to about 50 mole percent and more preferably in the range of from about 37 mole percent to about 40 mole percent. When the comonomer is propylene, the difference in mole percent propylene between the hard segment and the soft segment, $\Delta$ propylene, is greater than or equal to about 40.7 mole percent, greater than or equal to about 44.7 mole percent, preferably greater than or equal to about 46.8 mole percent, more preferably greater than or equal to about 48.8 mole percent and may also be greater than or equal to about 50.9 mole percent, and greater than or equal to 52.9 mole percent. In addition, the $\Delta$ propylene value may be in the range of from about 40.7 mole percent to about 95 mole percent, preferably in the range of from about 44.7 mole percent to about 65 mole percent and more preferably in the range of from about 48.8 mole percent to about 60 mole percent.

Measurement of Weight Percent of Hard and Soft Segments

As discussed above, the block interpolymers comprise hard segments and soft segments. The soft segments can be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent. Conversely, the hard segments can be present in a similar range as above. The soft segment weight percentage (and thus the hard segment weight percentage) can be measured by DSC or NMR.

Hard Segment Weight fraction Measured by DSC

For a block polymer having hard segments and soft segments, the density of the overall block polymer, $\rho_{overall}$, satisfies the following relationship:

$$\frac{1}{\rho_{overall}} = \frac{x_{hard}}{\rho_{hard}} + \frac{x_{soft}}{\rho_{soft}}$$

where $\rho_{hard}$, and $\rho_{soft}$, are the theoretical density of the hard segments and soft segments, respectively. $\chi_{hard}$, and $\chi_{soft}$, are the weight fraction of the hard segments and soft segments, respectively and they add up to one. Assuming $\rho_{hard}$ is equal to the density of ethylene homopolymer, i.e., 0.96 g/cc, and transposing the above equation, one obtains the following equation for the weight fraction of hard segments:

$$x_h = \frac{\frac{1}{\rho_{Overall}} - \frac{1}{\rho_{Soft}}}{-\frac{1}{\rho_{Overall}} + \frac{1}{0.96 \text{ g/cc}}}$$

In the above equation, $\rho_{overall}$ can be measured from the block polymer. Therefore, if $\rho_{soft}$ is known, the hard segment weight fraction can be calculated accordingly. Generally, the soft segment density has a linear relationship with the soft segment melting temperature, which can be measured by DSC over a certain range:

$$\rho_{soft} = A*T_m + B$$

where A and B are constants, and $T_m$ is the soft segment melting temperature in degrees Celsius. A and B can be determined by running DSC on various copolymers with a known density to obtain a calibration curve. It is preferable to create a soft segment calibration curve that span the range of composition (both comonomer type and content) present in the block copolymer. In some embodiments, the calibration curve satisfies the following relationship:

$$\rho_{soft} = 0.00049*T_m + 0.84990$$

TABLE 1

Fractional Block Index (BI) Calculations

| Fraction # | Weight Recovered (g) | ATREF Elution Temperature (°K) $T_x$ | Mole Fraction Ethylene (NMR) $P_x$ | Weight Fraction Recovered $w_i$ | Random Equivalent ATREF Temperature from NMR Ethylene Weight Fraction (°K) $T_{X0}$ | Random Equivalent mole fraction ethylene from ATREF Temperature $P_{X0}$ | Fractional Block Index based on Temperature formula $BI_i$ | Fractional Block Index based on $Log_e$ of mole fraction formula $BI_i$ | Weighted Fractional Block Indices $w_i * BI_i$ | Weighted Squared Deviations about the Weighted Mean (Note 2) $w_i * (BI_i - ABI)$ |
|---|---|---|---|---|---|---|---|---|---|---|
| 1 | 3.0402 | (Note 1) | 0.859 | 0.165 | (Note 1) | (Note 1) | 0 | 0 | 0 | (Note 1) |
| 2 | 1.9435 | 340 | 0.873 | 0.106 | 307 | 0.941 | 0.659 | 0.659 | 0.070 | 0.0017 |
| 3 | 0.7455 | 343.5 | 0.883 | 0.041 | 312 | 0.948 | 0.622 | 0.622 | 0.025 | 0.0003 |
| 4 | 1.0018 | 346 | 0.882 | 0.054 | 311 | 0.953 | 0.676 | 0.676 | 0.037 | 0.0011 |
| 5 | 2.3641 | 350 | 0.896 | 0.128 | 318 | 0.960 | 0.607 | 0.607 | 0.078 | 0.0007 |
| 6 | 4.1382 | 354 | 0.895 | 0.225 | 317 | 0.968 | 0.684 | 0.684 | 0.154 | 0.0052 |
| 7 | 3.5981 | 357 | 0.902 | 0.195 | 320 | 0.973 | 0.665 | 0.665 | 0.130 | 0.0035 |
| 8 | 1.2280 | 361.5 | 0.930 | 0.067 | 334 | 0.981 | 0.470 | 0.470 | 0.031 | 0.0003 |
| 9 | 0.3639 | 365 | 0.948 | 0.020 | 343 | 0.987 | 0.357 | 0.357 | 0.007 | 0.0006 |
| | | | | | | | | | ABI | |
| | 18.4233 | Total Weight | | 1.000 | Normalization check | | Weighted Sums | | 0.531 | 0.0135 |

(Note 1):
Fraction #1 does not crystallize in the analytical ATREF and is assigned $BI_i = 0$
(Note 2):
The weighted squared deviations about the weighted mean use only $BI_i > 0$ Therefore, the above equation can be used to calculate the soft segment density if $T_m$ in degrees Celsius is known.

For some block copolymers, there is an identifiable peak in DSC that is associated with the melting of the soft segments. In this case, it is relatively straightforward to determine $T_m$ for the soft segments. Once $T_m$ in degrees Celsius is determined from DSC, the soft segment density can be calculated and thus the hard segment weight fraction.

For other block copolymers, the peak associated with the melting of the soft segments is either a small hump (or bump) over the baseline or sometimes not visible. This difficulty can be overcome by converting a normal DSC profile into a weighted DSC profile. The following method is used to convert a normal DSC profile to a weighted DSC profile.

In DSC, the heat flow depends on the amount of the material melting at a certain temperature as well as on the temperature-dependent specific heat capacity. The temperature-dependence of the specific heat capacity in the melting regime of linear low density polyethylene leads to an increase in the heat of fusion with decreasing comonomer content. That is, the heat of fusion values get progressively lower as the crystallinity is reduced with increasing comonomer content. See Wild, L. Chang, S.; Shankernarayanan, M J. Improved method for compositional analysis of polyolefins by DSC. Polym. Prep 1990; 31: 270-1, which is incorporated by reference herein in its entirety.

For a given point in the DSC curve (defined by its heat flow in watts per gram and temperature in degrees Celsius), by taking the ratio of the heat of fusion expected for a linear copolymer to the temperature-dependent heat of fusion ($\Delta H$ (T)), the DSC curve can be converted into a weight-dependent distribution curve.

The temperature-dependent heat of fusion curve can be calculated from the summation of the integrated heat flow between two consecutive data points and then represented overall by the cumulative enthalpy curve.

The expected relationship between the heat of fusion for linear ethylene/octene copolymers at a given temperature is shown by the heat of fusion versus melting temperature curve. Using random ethylene/octene copolymers, one can obtain the following relationship:

Melt Enthalpy (J/g)=$0.0072*T_m^2$(° C.)+$0.3138*T_m$ (° C.)+8.9767

For each integrated data point, at a given temperature, by taking a ratio of the enthalpy from the cumulative enthalpy curve to the expected heat of fusion for linear copolymers at that temperature, fractional weights can be assigned to each point of the DSC curve.

It should be noted that, in the above method, the weighted DSC is calculated in the range from 0° C. until the end of melting. The method is applicable to ethylene/octene copolymers but can be adapted to other polymers.

Applying the above methodology to various polymers, the weight percentage of the hard segments and soft segments are calculated. It should be noted that sometimes it is desirable to assign 0.94 g/cc to the theoretical hard segment density, instead of using the density for homopolyethylene, due to the fact that the hard segments may include a small amount of comonomers.

Hard Segment Weight Percentage Measured by NMR $^{13}$C NMR spectroscopy is one of a number of techniques known in the art for measuring comonomer incorporation into a polymer. An example of this technique is described for the determination of comonomer content for ethylene/α-olefin copolymers in Randall (Journal of Macromolecular Science, Reviews in Macromolecular Chemistry and Physics, C29 (2 & 3), 201-317 (1989)), which is incorporated by reference herein in its entirety. The basic procedure for determining the comonomer content of an ethylene/olefin interpolymer involves obtaining a $^{13}$C NMR spectrum under conditions where the intensity of the peaks corresponding to the different carbons in a sample is directly proportional to the total number of contributing nuclei in the sample. Methods for ensuring this proportionality are known in the art and involve allowance for sufficient time for relaxation after a pulse, the use of gated-decoupling techniques, relaxation agents, and the like. The relative intensity of a peak or group of peaks is obtained in practice from its computer-generated integral. After obtaining the spectrum and integrating the peaks, those peaks associated with the comonomer are assigned. This assignment can be made by reference to known spectra or literature, or by synthesis and analysis of model compounds, or by the use of isotopically labeled comonomers. The mole % comonomer can be determined by the ratio of the integrals corresponding to the number of moles of comonomer to the integrals corresponding to the number of moles of all of the monomers in the interpolymer, as described in the aforementioned Randall reference.

Since the hard segment generally has less than about 2.0 wt % comonomer, its major contribution to the spectrum is only for the integral at about 30 ppm. The hard segment contribution to the peaks not at 30 ppm is assumed negligible at the start of the analysis. So for the starting point, the integrals of the peaks not at 30 ppm are assumed to come from the soft segment only. These integrals are fit to a first order Markovian statistical model for copolymers using a linear least squares minimization, thus generating fitting parameters (i.e., probability of octene insertion after octene, $P_{oo}$, and probability of octene insertion after ethylene, $P_{eo}$) that are used to compute the soft segment contribution to the 30 ppm peak. The difference between the total measured 30 ppm peak integral and the computed soft segment integral contribution to the 30 ppm peak is the contribution from the hard segment. Therefore, the experimental spectrum has now been deconvoluted into two integral lists describing the soft segment and hard segment, respectively. The calculation of weight percentage of the hard segment is straight forward and calculated by the ratio of the sum of integrals for the hard segment spectrum to the sum of integrals for the overall spectrum.

From the deconvoluted soft segment integral list, the comonomer composition can be calculated according to the method of Randall, for example. From the comonomer composition of the overall spectrum and the comonomer composition of the soft segment, one can use mass balance to compute the comonomer composition of the hard segment. From the comonomer composition of the hard segment, Bernoullian statistics is used to calculate the contribution of the hard segment to the integrals of non 30 ppm peaks. There is usually so little octene, typically from about 0 to about 1 mol %, in the hard segment that Bernoullian statistics is a valid and robust approximation. These contributions are then subtracted out from the experimental integrals of the non 30 ppm peaks. The resulting non 30 ppm peak integrals are then fitted to a first order Markovian statistics model for copolymers as described in the above paragraph. The iterative process is performed in the following manner: fit total non 30 ppm peaks then compute soft segment contribution to 30 ppm peak; then compute soft/hard segment split and then compute hard segment contribution to non 30 ppm peaks; then correct for hard segment contribution to non 30 ppm peaks and fit resulting non 30 ppm peaks. This is repeated until the values for soft/hard segment split converge to a minimum error function. The final comonomer compositions for each segment are reported.

Validation of the measurement is accomplished through the analysis of several in situ polymer blends. By design of the polymerization and catalyst concentrations the expected split is compared to the measured NMR split values. The soft/hard catalyst concentration is prescribed to be 74%/26%. The measured value of the soft/hard segment split is 78%/22%. Table 17 shows the chemical shift assignments for ethylene octene polymers.

TABLE 17

Chemical Shift Assignments for Ethylene/Octene Copolymers.

| | |
|---|---|
| 41-40.6 ppm | OOOE/EOOO αα CH2 |
| 40.5-40.0 ppm | EOOE αα CH2 |
| 38.9-37.9 ppm | EOE CH |
| 36.2-35.7 ppm | OOE center CH |
| 35.6-34.7 ppm | OEO αγ, OOO center 6B, OOEE αδ+, OOE center 6B CH2 |
| 34.7-34.1 ppm | EOE αδ+, EOE 6B CH2 |
| 33.9-33.5 ppm | OOO center CH |
| 32.5-32.1 ppm | 3B CH2 |
| 31.5-30.8 ppm | OEEO γγ CH2 |
| 30.8-30.3 ppm | OE γδ+ CH2 |
| 30.3-29.0 ppm | 4B, EEE δ+δ+ CH2 |
| 28.0-26.5 ppm | OE βδ+ 5B |
| 25.1-23.9 ppm | OEO ββ |
| 23.0-22.6 ppm | 2B |
| 14.5-14.0 ppm | 1B |

The following experimental procedures are used. A sample is prepared by adding 0.25 g in a 10 mm NMR tube with 2.5 mL of stock solvent. The stock solvent is made by dissolving 1 g perdeuterated 1,4-dichlorobenzene in 30 mL orthodichlorobenzene with 0.025 M chromium acetylacetonate (relaxation agent). The headspace of the tube is purged of oxygen by displacement with pure nitrogen. The sample tube is then heated in a heating block set at 150° C. The sample tube is repeatedly vortexed and heated until the solution flows consistently from top of the solution column to the bottom. The sample tube is then left in the heat block for at least 24 hours to achieve optimum sample homogeneity.

The $^{13}$C NMR data is collected using a Varian Inova Unity 400 MHz system with probe temperature set at 125° C. The center of the excitation bandwidth is set at 32.5 ppm with spectrum width set at 250 ppm. Acquisition parameters are optimized for quantitation including 90° pulse, inverse gated $^{1}$H decoupling, 1.3 second acquisition time, 6 seconds delay time, and 8192 scans for data averaging. The magnetic field is carefully shimmed to generate a line shape of less than 1 Hz at full width half maximum for the solvent peaks prior to data acquisition. The raw data file is processed using NUTS processing software (available from Acorn NMR, Inc. in Livermore, Calif.) and a list of integrals is generated.

Inventive carpet backing is analyzed for the soft/hard segment split and soft/hard comonomer composition. The following is the list of integrals for this polymer.

| Integral limit | Integral value |
|---|---|
| 41.0-40.6 ppm | 1.067 |
| 40.5-0.0 ppm | 6.247 |
| 38.9-37.9 ppm | 82.343 |
| 36.2-35.7 ppm | 14.775 |
| 35.6-34.7 ppm | 65.563 |
| 34.7-34.1 ppm | 215.518 |
| 33.9-33.5 ppm | 0.807 |
| 32.5-32.1 ppm | 99.612 |
| 31.5-30.8 ppm | 14.691 |
| 30.8-30.3 ppm | 115.246 |
| 30.3-29.0 ppm | 1177.893 |
| 28.0-26.5 ppm | 258.294 |
| 25.1-23.9 ppm | 19.707 |
| 23.0-22.6 ppm | 100 |
| 14.5-14.0 ppm | 99.895 |

Using Randall's triad method, the total octene weight percentage in this sample is determined to be 34.6%. Using all the above integrals excluding the 30.3-29.0 ppm integral to fit a first order Markovian statistical model, the values for $P_{oo}$ and $P_{eo}$ are determined to be 0.08389 and 0.2051, respectively. Using these two parameters, the calculated integral contribution from the soft segment to the 30 ppm peak is 602.586. Subtraction of 602.586 from the observed total integral for the 30 ppm peak, 1177.893, yields the contribution of the hard segment to the 30 ppm peak of 576.307. Using 576.307 as the integral for the hard segment, the weight percentage of hard segment is determined to be 26%. Therefore the soft segment weight percentage is 100−26=74%. Using the above values for $P_{oo}$ and $P_{eo}$, the octene weight percentage of the soft segment is determined to be 47%. Using the overall octene weight percentage and the octene weight percentage of the soft segment as well as the soft segment weight percentage, the octene weight percentage in the hard segment is calculated to be negative 2 wt %. This value is within the error of the measurement. Thus there is no need to iterate back to account for hard segment contribution to non 30 ppm peaks.

Another aspect of the present invention is a method of making a carpet, the carpet having a collapsed, non-expanded adhesive backing material matrix and comprising yarn attached to a primary backing material, the adhesive backing material comprising at least one ethylene polymer and is in intimate contact with the primary backing material and has substantially penetrated and substantially consolidated the yarn, the method comprising the step of adding an effective amount of at least one implosion agent to the adhesive backing material and thereafter activating the implosion agent during an extrusion coating step such that molten or semi-molten polymer is forced into the free space of yarn exposed on the backside of the primary backing material.

Another aspect of the present invention is a method of making a carpet, the carpet having a face surface and comprising yarn, a primary backing material, an adhesive backing material and an optional secondary backing material, wherein the primary backing material has a back surface opposite the face surface of the carpet, the yarn is attached to the primary backing material, the adhesive backing material is applied to the back surface of the primary backing material and the optional secondary backing material is applied onto the adhesive backing material, the method comprising the step of scouring, washing or flashing the back surface of the primary backing material with steam, solvent and/or heat prior to the application of the adhesive backing material to substantially remove or displace processing materials.

The terms "intimate contact," "substantial encapsulation," and/or "substantial consolidation" are used herein to refer to mechanical adhesion or mechanical interactions (as opposed to chemical bonding) between dissimilar carpet components, irrespective of whether or not one or more carpet component is capable of chemically interacting with another carpet component. With respect to the mechanical adhesion or interactions of the present invention, there may be some effective amount of intermixing or inter-melting of polymeric materials; however, there is no continuous or integral fusing of various components as determined from visual inspection of photomicrographs (at 20× magnification) of the various carpet interfaces. Within this meaning, fusion of yarn or fiber bundles or of individual fibers to one another within a fiber bundle is not considered integral fusion in itself since fibers are referred to herein as one carpet component.

The term "intimate contact" refers to the mechanical interaction between the back surface of the primary backing material and the adhesive backing material.

The term "substantial encapsulation" refers to the adhesive backing material significantly surrounding the yarn or fiber bundles at or in immediate proximity to the interface between the back surface of the primary backing material and the adhesive backing material. The term "substantial consolidation" refers to the overall integrity and dimensional stability of the carpet that is achieved by substantially encapsulating the yarn or fiber bundles and intimately contacting the back surface of the primary backing material with the adhesive backing material. A substantially consolidated carpet possesses good component cohesiveness and good delamination resistance with respect to the various carpet components.

The term "integral fusing" is used herein in the same sense as known in the art and refers to heat bonding of carpet components using a temperature above the melting point of the adhesive backing material. Integral fusing occurs when the adhesive backing material comprises the same polymer as either the fibers or primary backing material or both.

However, integral fusing does not occur when the adhesive backing material comprises a different polymer than the fibers and primary backing material. By the term "same polymer," it is meant that the monomer units of the polymers are of the same chemistry, although their molecular or morphological attributes may differ. Conversely, by the term "different polymer," it is meant that, irrespective of any molecular or morphological differences, the monomer units of the polymers are of different chemistries. Thus, in accordance with the various definitions of the present invention, a polypropylene primary backing material and a polyethylene adhesive backing material would not integrally fuse because these carpet components are of different chemistries. The term "carpet component" is used herein to refer separately to carpet fiber bundles, the primary backing material, the adhesive backing material and the optional secondary backing material.

Figure 2:
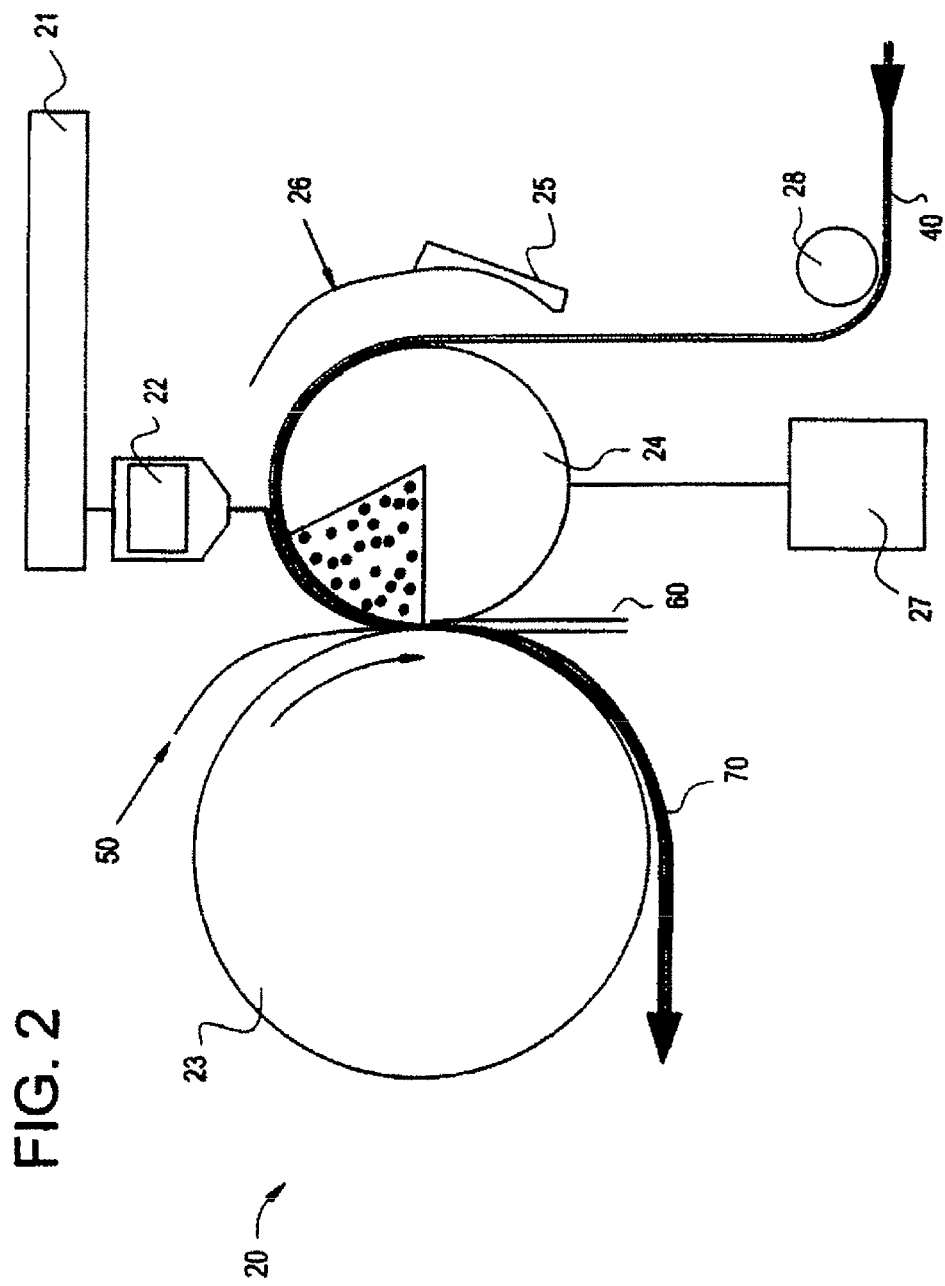
FIG. 2 is a schematic representation of an extrusion coating line 20 for making a carpet 70.

The term "extrusion coating" is used herein in its conventional sense to refer to an extrusion technique wherein a polymer composition usually in pellet-form is heated in an extruder to a temperature elevated above its melt temperature and then forced through a slot die to form a semi-molten or molten polymer web. The semi-molten or molten polymer web is continuously drawn down onto a continuously fed greige good to coat the backside of the greige good with the polymer composition. FIG. 2 illustrates an extrusion process of the present invention wherein, at the nip, the face surface of the greige good is oriented towards the chill roll and the back surface of the adhesive backing material oriented is towards the nip pressure roll. Extrusion coating is distinct from a lamination technique.

The term "lamination technique" is used herein in its conventional sense refer to applying adhesive backing materials to greige goods by first forming the adhesive backing material as a solidified or substantially solidified film or sheet and thereafter, in a separate processing step, reheating or elevating the temperature of the film or sheet before applying it to the back surface of the primary backing material. The term "heat content" is used herein to refer to the mathematical product of the heat capacity and specific gravity of a filler. Fillers characterized as having high heat content are used in specific embodiments of the present invention to extend the solidification or molten time of adhesive backing materials. The Handbook for Chemical Technicians, Howard J. Strauss and Milton Kaufmann, McGraw Hill Book Company, 1976, Sections 1-4 and 2-1 provides information on the heat capacity and specific gravity of select mineral fillers. The fillers suitable for use in the present invention do not change their physical state (i.e., remain a solid material) over the extrusion coating processing temperature ranges of the present invention.

Preferred high heat content fillers possess a combination of a high specific gravity and a high heat capacity.

The term "implosion agent" is used herein to refer to the use of conventional blowing agents or other compounds which out-gas or cause out-gassing when activated by heat, usually at some particular activation temperature. In the present invention, implosion agents are used to implode or force adhesive backing material into the free space of yarn or fiber bundles.

The term "processing material" is used herein to refer to substances such as spin finishing waxes, equipment oils, sizing agents and the like, which can interfere with the adhesive or physical interfacial interactions of adhesive backing materials. Processing materials can be removed or displaced by a scouring or washing technique of the present invention whereby improved mechanical bonding is accomplished. The terms "polypropylene carpet" and "polypropylene greige goods" are used herein to mean a carpet or greige goods substantially comprised of polypropylene fibers, irrespective of whether the primary backing material for the carpet or greige good is comprised of polypropylene or some other material.

The terms "nylon carpet" and "nylon greige goods" are used herein to mean a carpet or greige goods substantially comprised of nylon fibers, irrespective of whether the primary backing material for the carpet or greige good is comprised of nylon or some other material.

The term "linear" as used to describe ethylene polymers is used herein to mean the polymer backbone of the ethylene polymer lacks measurable or demonstrable long chain branches, e.g., the polymer is substituted with an average of less than 0.01 long branch/1000 carbons.

The term "homogeneous ethylene polymer" as used to describe ethylene polymers is used in the conventional sense in accordance with the original disclosure by Elston in U.S. Pat. No. 3,645,992, to refer to an ethylene polymer in which the comonomer is randomly distributed within a given polymer molecule and wherein substantially all of the polymer molecules have substantially the same ethylene to comonomer molar ratio. As defined herein, both substantially linear ethylene polymers and homogeneously branched linear ethylene are homogeneous ethylene polymers.

Olefin block copolymers, especially ethylene based block interpolymers are described and claimed in various patent applications, including U.S. Pat. No. 7,355,089 (Chang et al.), incorporated herein by reference, WO 2005/090425, WO 2005/090426 and WO 2005/090427.

We have discovered that olefin block copolymers, especially ethylene based block interpolymers, offer unique advantages for extrusion coated carpet backing applications, especially for commercial and residential carpet markets. Olefin block copolymers, especially ethylene based block interpolymers, have low solidification temperatures, good adhesion to polypropylene, and low modulus relative to conventional ethylene polymers such as low density polyethylene (LDPE), heterogeneously branched linear low density polyethylene (LLDPE), high density polyethylene (HDPE), and heterogeneously branched ultra low density polyethylene (ULDPE). As such, olefin block copolymer, especially ethylene based block interpolymers are useful for making carpet fibers, primary backing materials, adhesive backing materials and optional secondary backing materials. However, olefin block copolymer, especially ethylene based block interpolymers are particularly useful as adhesive backing materials for tufted carpet and non-tufted carpet (e.g., needle-punched carpet) and are especially useful for tufted carpets.

In the present invention, during extrusion coating of the backside of carpet to apply an adhesive backing material, properly selected ethylene block interpolymers show good penetration of carpet yarns (fiber bundles) and also allow good consolidation of the fibers within the yarn.

When used for tufted carpets, the tuft bind strength and abrasion resistance of the carpet is increased by the penetration of ethylene block interpolymers into the yarn. Preferably, a tuft bind (or tuft lock) strength of 3.25 pounds (1.5 kg) or more is achieved, more preferably 5 pounds (2.3 kg) or more and most preferably 7.5 pounds (3.4 kg) or more. In addition to improved penetration of the yarn, tuft bind strength can be also be increased by increasing the molecular weight of the polymer. However, a higher polymer molecular weight selected for improved tuft bind strength is contra to the requirement of a lower polymer molecular weight which is generally needed for good yarn penetration and good extrusion coatability. Also, higher polymer densities are desirable for improved chemical and barrier resistance, yet higher densities invariably yield stiffer carpets. As such, polymer properties must be chosen such that a balance is maintained between extrusion coatability and abrasion resistance as well as between chemical resistance and carpet flexibility.

When carpet greige goods are backed with properly selected ethylene block interpolymers, the low flexural modulus of these polymers offers advantages in ease of carpet installation and general carpet handling.

Ethylene block interpolymers, in particular, when employed as an adhesive backing material show enhanced mechanical adhesion to polypropylene which improves the consolidation and delamination resistance of the various carpet layers and components, i.e., polypropylene fibers, fiber bundles, the primary backing material, the adhesive backing material and the secondary backing material when optionally applied. Consequently, exceptionally good abrasion resistance and tuft bind strength can be obtained.

Good abrasion resistance is especially important in commercial carpet cleaning operations as good abrasion resistance generally improves carpet durability.

Properly selected ethylene block interpolymers can allow the elimination of secondary backing materials and as such can result in significant manufacturing cost savings. In addition, carpets adhesively backed with an ethylene block interpolymer can provide a substantial fluid and particle barrier which enhances the hygienic properties of carpet.

An ethylene block interpolymer adhesive backing material can allow totally recyclable carpet products particularly where the carpet comprises polypropylene fibers.

In addition, the mixture of an ethylene block interpolymer with a fiber-grade polypropylene resin can result in an impact modified recycle composition which is useful for injection molding and other molding applications as well as reuse in carpet construction, for example, as the primary backing material or as a blend component of the adhesive backing material polymer composition. That is, polyolefin polymer mixtures can involve sufficiently similar polymer chemistries, compatibilities, and/or miscibilities to permit good recyclability without having sufficient similarities to permit integral fusion.

The preferred olefin block copolymer, especially ethylene based block copolymers has a single melting peak between −30° C. and 150° C., as determined using differential scanning calorimetry. Preferably, the ethylene based block interpolymer has a single differential scanning calorimetry, DSC, melting peak between −30° C. and 150° C., usually between about 100 and about 130° C.

The ethylene based block interpolymers used in the present invention are characterized by a single DSC melting peak. The single melting peak is determined using a differential scanning calorimeter standardized with indium and deionized water. The method involves 5-7 mg sample sizes, a "first heat" to about 140° C. which is held for 4 minutes, a cool down at 10° C./min. to −30° C. which is held for 3 minutes, and heat up at 10° C./min. to 150° C. for the "second heat". The single melting peak is taken from the "second heat" heat flow vs. temperature curve. Total heat of fusion of the polymer is calculated from the area under the curve.

Whole polymer product samples and individual polymer components are analyzed by gel permeation chromatography (GPC) on a Waters 150 high temperature chromatographic unit equipped with three mixed porosity columns (Polymer Laboratories $10^3$, $10^4$, $10^5$ and $10^6$ A), operating at a system temperature of 140° C. The solvent is 1,2,4-trichlorobenzene, from which 0.3 percent by weight solutions of the samples are prepared for injection. The flow rate is 1.0 milliliters/minute and the injection size is microliters. The molecular weight determination with is deduced by using narrow molecular weight distribution polystyrene standards (from Polymer Laboratories) in conjunction with their elution volumes. The equivalent polyethylene molecular weights are determined by using appropriate Mark-Houwink coefficients for polyethylene and polystyrene (as described by Williams and Ward in Journal of Polymer Science, Polymer Letters, Vol. 6, p. 621, 1968) to derive the following equation: $M_{polyethylene} = a(M_{polystyrene})^b$ In this equation, a=0.4316 and b=1.0. Weight average molecular weight, Mw, and number average molecular weight, Mn, are calculated in the usual manner according to the following formula: $M_w = \Sigma w_i * (M_i)$; where $w_i$ and $M_i$ are the weight fraction and molecular weight of the $i^{th}$ fraction eluting from the GPC column.

Embodiments disclosed herein may also include a polymeric component that may include at least one multi-block olefin interpolymer. Suitable multi-block olefin interpolymers may include those described in U.S. Provisional Patent Application No. 60/818,911, for example. The term "multi-block copolymer" or refers to a polymer comprising two or more chemically distinct regions or segments (referred to as "blocks") preferably joined in a linear manner, that is, a polymer comprising chemically differentiated units which are joined end-to-end with respect to polymerized ethylenic functionality, rather than in pendent or grafted fashion. In certain embodiments, the blocks differ in the amount or type of comonomer incorporated therein, the density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The multi-block copolymers are characterized by unique distributions of polydispersity index (PDI or Mw/Mn), block length distribution, and/or block number distribution due to the unique process making of the copolymers. More specifically, when produced in a continuous process, embodiments of the polymers may possess a PDI ranging from about 1.7 to about 8; from about 1.7 to about 3.5 in other embodiments; from about 1.7 to about 2.5 in other embodiments; and from about 1.8 to about 2.5 or from about 1.8 to about 2.1 in yet other embodiments. When produced in a batch or semi-batch process, embodiments of the polymers may possess a PDI ranging from about 1.0 to about 2.9; from about 1.3 to about 2.5 in other embodiments; from about 1.4 to about 2.0 in other embodiments; and from about 1.4 to about 1.8 in yet other embodiments.

One example of the multi-block olefin interpolymer is an ethylene/α-olefin block interpolymer. Another example of the multi-block olefin interpolymer is a propylene/α-olefin interpolymer. The following description focuses on the interpolymer as having ethylene as the majority monomer, but applies in a similar fashion to propylene-based multi-block interpolymers with regard to general polymer characteristics.

The ethylene/α-olefin multi-block interpolymers may comprise ethylene and one or more co-polymerizable α-olefin comonomers in polymerized form, characterized by multiple (i.e., two or more) blocks or segments of two or more polymerized monomer units differing in chemical or physical properties (block interpolymer), preferably a multi-block interpolymer. In some embodiments, the multi-block interpolymer may be represented by the following formula:

(AB)$_n$ where n is at least 1, preferably an integer greater than 1, such as 2, 3, 4, 5, 10, 15, 20, 30, 40, 50, 60, 70, 80, 90, 100, or higher; "A" represents a hard block or segment; and "B" represents a soft block or segment. Preferably, A's and B's are linked in a linear fashion, not in a branched or a star fashion. "Hard" segments refer to blocks of polymerized units in which ethylene is present in an amount greater than 95 weight percent in some embodiments, and in other embodiments greater than 98 weight percent. In other words, the comonomer content in the hard segments is less than 5 weight percent in some embodiments, and in other embodiments, less than 2 weight percent of the total weight of the hard segments. In some embodiments, the hard segments comprise all or substantially all ethylene. "Soft" segments, on the other hand, refer to blocks of polymerized units in which the comonomer content is greater than 5 weight percent of the total weight of the soft segments in some embodiments, greater than 8 weight percent, greater than 10 weight percent, or greater than 15 weight percent in various other embodiments. In some embodiments, the comonomer content in the soft segments may be greater than 20 weight percent, greater than 25 eight percent, greater than 30 weight percent, greater than 35 weight percent, greater than 40 weight percent, greater than 45 weight percent, greater than 50 weight percent, or greater than 60 weight percent in various other embodiments.

In some embodiments, A blocks and B blocks are randomly distributed along the polymer chain. In other words, the block copolymers do not have a structure like:

AAA-AA-BBB-BB

In other embodiments, the block copolymers do not have a third block. In still other embodiments, neither block A nor block B comprises two or more segments (or sub-blocks), such as a tip segment.

The multi-block interpolymers may be characterized by an average block index, ABI, ranging from greater than zero to about 1.0 and a molecular weight distribution, Mw/Mn, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where BI$_i$ is the block index for the ith fraction of the multi-block interpolymer obtained in preparative TREF, and wi is the weight percentage of the ith fraction.

Similarly, the square root of the second moment about the mean, hereinafter referred to as the second moment weight average block index, may be defined as follows:

$$BI = \sqrt{\frac{\Sigma(w_i(BI_i - ABI)^2)}{\frac{(N-1)\Sigma w_i}{N}}}$$

2nd moment weight average

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{\text{Ln} P_X - \text{Ln} P_{XO}}{\text{Ln} P_A - \text{Ln} P_{AB}}$$

where T$_X$ is the analytical temperature rising elution fractionation (ATREF) elution temperature for the i$^{th}$ fraction (preferably expressed in Kelvin), P$_X$ is the ethylene mole fraction for the ith fraction, which may be measured by NMR or IR as described below. P$_{AB}$ is the ethylene mole fraction of the whole ethylene/α-olefin interpolymer (before fractionation), which also may be measured by NMR or IR. T$_A$ and P$_A$ are the ATREF elution temperature and the ethylene mole fraction for pure "hard segments" (which refer to the crystalline segments of the interpolymer). As an approximation or for polymers where the "hard segment" composition is unknown, the T$_A$ and P$_A$ values are set to those for high density polyethylene homopolymer.

T$_{AB}$ is the ATREF elution temperature for a random copolymer of the same composition (having an ethylene mole fraction of P$_{AB}$) and molecular weight as the multi-block interpolymer. T$_{AB}$ may be calculated from the mole fraction of ethylene (measured by NMR) using the following equation:

$$\text{Ln } P_{AB} = \alpha/T_{AB} + \beta$$

where α and β are two constants which may be determined by a calibration using a number of well characterized preparative TREF fractions of a broad composition random copolymer and/or well characterized random ethylene copolymers with narrow composition. It should be noted that α and β may vary from instrument to instrument. Moreover, one would need to create an appropriate calibration curve with the polymer composition of interest, using appropriate molecular weight ranges and comonomer type for the preparative TREF fractions and/or random copolymers used to create the calibration. There is a slight molecular weight effect. If the calibration curve is obtained from similar molecular weight ranges, such effect would be essentially negligible. In some embodiments, random ethylene copolymers and/or preparative TREF fractions of random copolymers satisfy the following relationship:

$$\text{Ln } P = -237.83/T_{ATREF} + 0.639$$

The above calibration equation relates the mole fraction of ethylene, P, to the analytical TREF elution temperature, T$_{ATREF}$, for narrow composition random copolymers and/or preparative TREF fractions of broad composition random copolymers. TXO is the ATREF temperature for a random copolymer of the same composition and having an ethylene mole fraction of PX. TXO may be calculated from $LnPX=\alpha/TXO+\beta$. Conversely, PXO is the ethylene mole fraction for a random copolymer of the same composition and having an ATREF temperature of TX, which may be calculated from $Ln PXO=\alpha/TX+\beta$.

Once the block index (BI) for each preparative TREF fraction is obtained, the weight average block index, ABI, for the whole polymer may be calculated. In some embodiments, ABI is greater than zero but less than about 0.4 or from about 0.1 to about 0.3. In other embodiments, ABI is greater than about 0.4 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the multi-block interpolymer is that the interpolymer may comprise at least one polymer fraction which may be obtained by preparative TREF, wherein the fraction has a block index greater than about 0.1 and up to about 1.0 and the polymer having a molecular weight distribution, Mw/Mn, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

The multi-block interpolymers disclosed herein may be differentiated from conventional, random copolymers, physical blends of polymers, and block copolymers prepared via sequential monomer addition, fluxional catalysts, and anionic or cationic living polymerization techniques. In particular, compared to a random copolymer of the same monomers and monomer content at equivalent crystallinity or modulus, the interpolymers have better (higher) heat resistance as measured by melting point, higher TMA penetration temperature, higher high-temperature tensile strength, and/or higher high-temperature torsion storage modulus as determined by dynamic mechanical analysis. Multi-block interpolymers, as compared to a random copolymer containing the same monomers and monomer content, have lower compression set, particularly at elevated temperatures, lower stress relaxation, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

Suitable olefin block copolymer, especially ethylene based block interpolymers for use in the present invention include interpolymers of ethylene and at least one alpha-olefin prepared by a solution, gas phase or slurry polymerization process or combinations thereof. Suitable alpha-olefins are represented by the following formula: $CH_2=CHR^*$ where R is a hydrocarbyl radical. Further, R may be a hydrocarbyl radical having from one to twenty carbon atoms and as such the formula includes $C_3$-$C_{20}$ alpha-olefins. Suitable alpha-olefins for use as comonomers include propylene, 1-butene, 1-isobutylene, 1-pentene, 1-hexene, 4-methyl-1-pentene, 1-heptene and 1-octene, as well as other comonomer types such as styrene, halo- or alkyl-substituted styrenes, tetrafluoroethylene, vinyl benzocyclobutane, 1,4-hexadiene, 1,7-octadiene, and cycloalkenes, e.g., cyclopentene, cyclohexene and cyclooctene. Preferably, the comonomer will be 1-butene, 1-pentene, 4-methyl-1-pentene, 1-hexene, 1-heptene, 1-octene, or mixtures thereof, as adhesive backing materials comprised of higher alpha-olefins will have especially improved toughness. By the term "interpolymer" is meant that the main (dominant) monomer is copolymerized with at least one other comonomer. Thus the term interpolymer can refer to a copolymer as well as terpolymers (3 monomers) and the like.

However, most preferably, the comonomer will be 1-octene and the ethylene polymer will be prepared in a solution process.

The density of the ethylene based block interpolymers, as measured in accordance with ASTM D-792, generally does not exceed 0.92 g/cc, and is generally in the range from about 0.85 g/cc to about 0.92 g/cc, preferably from about 0.86 g/cc to about 0.91 g/cc, and especially from about 0.86 g/cc to about 0.90 g/cc. The molecular weight of the ethylene based block copolymer is conveniently indicated using a melt index measurement according to ASTM D-1238, Condition 190C/2.16 kg (formerly known as "Condition (E)" and also known as $I_2$). Melt index is inversely proportional to the molecular weight of the polymer. Thus, the higher the molecular weight, the lower the melt index, although the relationship is not linear. The melt index for the ethylene based block interpolymers is generally from about 1 grams/10 minutes (g/10 min) to about 500 g/10 min, preferably about 2 g/10 min. to about 300 g/10 min., more preferably from about 5 g/10 min to about 100 g/10 min., especially from about 10 g/10 min. to about 50 g/10 min., and most especially about 25 to about 35 g/10 min. Another measurement useful in characterizing the molecular weight of the ethylene based block interpolymers is conveniently indicated using a melt index measurement according to ASTM D1238, Condition 190° C./10 kg (formerly known as "Condition (N)" and also known as $I_{10}$). The ratio of the $I_{10}$ and the $I_2$ melt index terms is the melt flow ratio and is designated as $I_{10}/I_2$. The $I_{10}/I_2$ ratio of the ethylene based block interpolymers is at least 6.5, preferably at least 7, especially at least 8.

Preferred ethylene polymers for us in the present invention have a relative low modulus. That is, the ethylene polymer is characterized as having a 2% secant modulus less than 24,000 psi (163.3 MPa), especially less than 19,000 psi (129.3 MPa) and most especially less than 14,000 psi (95.2 MPa), as measured in accordance with ASTM D790.

Preferred ethylene polymers for use in the present invention are substantially amorphous or totally amorphous. That is, the ethylene polymer is characterized as having a percent crystallinity less than 40 percent, preferably less than 30 percent, more preferably less than 20 and most preferably less than 10 percent, as measured by differential scanning calorimetry using the equation percent crystallinity=

(Hf/292)*100, where Hf is the heat of fusion in Joules/gram. The olefin block copolymer, especially ethylene based block interpolymers can be used alone or can be blended or mixed with one or more synthetic or natural polymeric material. Suitable polymers for blending or mixing with olefin block copolymer, especially ethylene based block interpolymers used in the present invention include, but are not limited to, another olefin block copolymer, especially ethylene based block interpolymers, low density polyethylene, heterogeneously branched LLDPE, heterogeneously branched ULDPE, medium density polyethylene, high density polyethylene, grafted polyethylene (e.g. a maleic anhydride extrusion grafted heterogeneously branched linear low polyethylene or a maleic anhydride extrusion grafted (MAH-g) homogeneously branched ultra low density polyethylene), ethylene acrylic acid copolymer, ethylene vinyl acetate copolymer, ethylene ethyl acrylate copolymer, polystyrene, polypropylene, polyester, polyurethane, polybutylene, polyamide, polycarbonate, rubbers, ethylene propylene polymers, ethylene styrene polymers, styrene block copolymers, and vulcanates.

The actual blending or mixing of various polymers may be conveniently accomplished by any technique known in the art including, but not limited to, melt extrusion compounding, dry blending, roll milling, melt mixing such as in a Banbury mixer and multiple reactor polymerization.

Preferred blends or mixtures include an olefin block copolymer, especially ethylene based block interpolymers and a heterogeneously branched ethylene alpha-olefin interpolymer wherein the alpha-olefin is a $C_3$-$C_8$ alpha-olefin prepared using two reactors operated in parallel or in series with different catalyst systems employed in each reactor.

A range of resin properties, processing conditions and equipment configurations have been discovered for extrusion coatable carpet backing systems that deliver performance similar or better than incumbent latex and polyurethane systems.

FIG. 1 is an illustration of a tufted carpet 10.

The tufted carpet 10 is made of a primary backing material 11 with yarn 12 tufted therethrough; an adhesive backing material 13 which is in intimate contact with the back surface of the primary backing material 11, substantially encapsulates the yarn 12 and penetrates the yarn 12 and binds individual carpet fibers; and an optional secondary backing material 14 applied to the back surface of the adhesive backing material 13.

FIG. 2 is an illustration of an extrusion coating line 20 for making a carpet 70. The line 20 includes an extruder 21 equipped with a slot die 22, a nip roll 24, a chill roll 23, an exhaust hood 26, a greige good feeder roll 28 and a pre-heater 25. As illustrated, the nip roll is preferably equipped with a vacuum slot 29 to draw a vacuum across about 60 degrees or about 17 percent of its circumference and is equipped with a vacuum pump 27. The slot die 22 dispenses an adhesive backing material in the form of a semi-molten or molten polymer web 30 onto greige good 40 with the polymer web 30 towards the chill roll 23 and the greige good 40 towards the optional vacuum nip roll 24.

As illustrated, an optional secondary backing material 50 is applied onto the polymer web 30.

The point where the nip roll 24 and the chill roll 23 are closest to one another is referred to as the nip 60.

The present invention is useful in producing carpets with face yarn made from various materials including, but not limited to, polypropylene, nylon, wool, cotton, acrylic, polyester and polytrimethylenetheraphthalate (PTT).

However, again because one of the objects of the present invention is to provide a recyclable carpet such as, for example, a 100% polyolefin carpet, the most preferred yarn comprises a polyolefin, more preferably, polypropylene. Most preferably, the yarn used in the present invention is an air entangled 2750 denier polypropylene yarn such as that produced by Shaw Industries, Inc. and sold under the designation "Permacolor 2750 Type 015." The preferred primary backing material comprises a polyolefin, more preferably polypropylene.

Alternatively, other types of primary backing materials, such as non-woven webs, can also be used. Although other materials, such as polyesters or polyamides can be used for the primary backing material, it is preferred to use a polyolefin so that the objective of producing a carpet made entirely from polyolefins is achieved. In addition, polypropylene primary backing materials are typically lower in cost.

The method of tufting or needle-punching the yarn is not deemed critical to the present invention. Thus, any conventional tufting or needle-punching apparatus and stitch patterns can be used. Likewise, it does not matter whether tufted yarn loops are left uncut to produce a loop pile; cut to make cut pile; or cut, partially cut and uncut to make a face texture known as tip sheared.

After the yarn is tufted or needle-punched into the primary backing material, the greige good is typically rolled up with the back side of the primary backing material facing outward and held until it is transferred to the backing line.

In a preferred embodiment, the greige good is scoured or washed before it has an adhesive backing material extruded thereon. In particular, yarn that is tufted or needle-punched to make carpet often has varying quantities of processing materials, most commonly oily or waxy chemicals, known as spin-finish chemicals, remaining thereon from the yarn manufacturing processes. It has been found to be preferable to remove or displace all or substantially all of these processing materials prior to extruding the adhesive backing material onto the back surface of the primary backing material. A preferred scouring or washing method includes passing the greige good through a bath containing an aqueous detergent solution at about 64 to about 70° C. (e.g., 67° C.). After the detergent washing processing step, the greige good is dried or preheated. Drying can be accomplished at a temperature of about 108° C. to about 112° C. (e.g., 110° C.) for about 1.8 to about 2.2 minutes (e.g., 2 minutes).

Another preferred scouring or washing method includes using a wet vacuum cleaner system that initially dispenses ambient temperature water or heated water (either optionally containing a detergent or cleaning solution) onto the primary backing material side of the greige good and then sequentially vacuums up the water and retained amounts of processing materials. The wet vacuum system is suitably adapted with a dispensing and vacuum wand or head such that the entire width of the greige good can be wet vacuumed at least once on a continuous extrusion coating line. After the wet vacuuming processing step, the greige good is suitably dried and/or preheated. Suitable detergents, cleaning solutions or cleaning concentrates for use in a wet vacuuming method includes, but is not limited to, aqueous alkaline solutions, for example, those consisting of ethylene diamine tetracetic acid tetrasodium salt. One suitable wet vacuum cleaner system is the RinsevaCTM carpet cleaning system and one suitable cleaning concentrate is the RinsevaCTM Professional Carpet Cleaner both supplied by Blue Lustre Products, Inc., Indianapolis, Ind.

Other suitable methods of the present invention for scouring or washing processing materials, adaptable to an extrusion coating line such as, for example, the one illustrated in FIG. 2, include steam cleaning, flashing at elevated temperatures and/or under vacuum, and solvent chemical washing of the greige good.

It is also contemplated that the use of polyolefin waxes (rather than conventional organic and mineral oils) as processing materials would allow improved adhesive backing material performance in itself or at least less demanding scouring or washing requirements. Nevertheless, practitioners will find that scouring or washing requirements may vary with the amount and specific type of processing materials present. That is, higher quantities of process materials and/or higher molecular processing materials may require more stringent scouring and washing techniques such as, for example, multiple washing and drying steps using concentrated washing solutions based on softened or deionized water. Practitioners will also recognize that scouring and washing requirements for effectively removing or displacing processing materials may be more extensive than ordinary washings or other cleaning procedures performed for cosmetic or decorative purposes or performed to simply remove loose fibers, primary backing material or other debris that ordinarily result from tufting, needle-punch and/or cutting operations. In another aspect of the present invention, the greige good is coated with an aqueous pre-coat material, either as a final backing or preferably before an adhesive backing material is extruded thereon. The particles in this dispersion can be made from olefin block copolymers.

Most preferably, the olefin block copolymer particles are present in an amount between about 10 and 75 percent by weight of the dispersion, more preferably between about 30 and about 65 percent, and most preferably between about 40 and about 60 percent. The particle size of the polyolefin particles is important both to ensure that a good dispersion is achieved and also to ensure that the polyolefin particles penetrate the yarn and primary backing so as to provide good abrasion resistance. Preferably, the average particle size of the polyolefin particles is between about 0.3 and about 1000 microns, and more preferably between about 0.5 and 10 microns.

Preferably, the polyolefin block copolymer particles have a Vicat softening point (as measured in accordance with ASTM D1525) between about 50 and about 120° C., and more preferably between about 75 and 120° C. The most preferred polyethylene particles referred to above have a softening point of about 80 to about 85° C. The olefin block copolymers particles preferably have an $I_2$ melt index (ASTM D-1238 Condition 190/2.16) between about 0.5 and about 100 g/10 minutes, and more preferably between about 5 and about 15 g/10 minutes.

Ethylene acrylic acid (EAA) may be used in combination with the olefin block copolymer particles. It has been found that EAA can increase the adhesion of the pre-coat to the yarn and primary backing, as well as to a thermoplastic sheet extruded thereon.

The aqueous dispersion preferably contains other ingredients. For example, a surfactant is preferably included to aid in keeping the polyolefin particles dispersed. Suitable surfactants are nonionic, anionic, cationic and fluorosurfactants. Preferably, the surfactant is present in an amount between about 0.01 and about 1 weight percent based on the total weight of the dispersion. More preferably, the surfactant is anionic. For example, a formulation of the present invention can include surfactants, frothing agents, dispersants, thickeners, fire retardants, pigments, antistatic agents, reinforcing fibers, antioxidants, a neutralizing agent, a rheology modifier, preservatives, biocides, acid scavengers, a wetting agent, and the like. While optional for purposes of the present invention, other components can be highly advantageous for product stability during and after the manufacturing process.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent can be included in a composition of the present invention at a concentration of at least about 0.5 part per 100 parts of filler, by weight.

Furthermore, embodiments of the present invention may optionally include a thickener. Thickeners can be useful in the present invention to increase the viscosity of low viscosity dispersions. Thickeners suitable for use in the practice of the present invention can be any known in the art such as for instance poly-acrylate type or associate non ionic thickeners such as modified cellulose ethers. For example, suitable thickeners include ALCOGUM™ VEP-II (trade name of Alco Chemical Corporation), Rheovis™ and Viscalex™ (trade names of Ciba Ceigy), UCAR® Thickener 146, or Ethocell™ or Methocell™ (trade names of The Dow Chemical Company) and PARAGUM™ 241 (trade name of Para-Chem Southern, Inc.), or Bermacol™ (trademark of Akzo Nobel) or Aqualon™ (trademark Hercules) or ACUSOL® (trademark Rohm and Haas). Thickeners can be used in any amount necessary to prepare a compound of desired viscosity.

The ultimate viscosity of the dispersion is, therefore, controllable. Addition of the thickener to the dispersion including the amount of filler can be done with conventional means to result in viscosities as needed for the carpet coating. Viscosities of thus compounds can reach +3000 cP (Brookfield spindle 4 with 20 rpm) with moderate thickener dosing (up to 4% preferably, below 3% based on 100 phr of polymer dispersion). The starting polymer dispersion as described has an initial viscosity prior to formulation with fillers and additives between 20 and 1000 cP (Brookfield viscosity measured at room temperature with spindle rv3 at 50 rpm). Still more preferably, the starting viscosity of the dispersion may be between about 100 to about 600 cP.

For example, a formulation of the present invention can include surfactants, frothing agents, dispersants, thickeners, fire retardants, pigments, antistatic agents, reinforcing fibers, antioxidants, a neutralizing agent, a rheology modifier, preservatives, biocides, acid scavengers, a wetting agent, and the like. While optional for purposes of the present invention, other components can be highly advantageous for product stability during and after the manufacturing process.

In addition, embodiments of the present invention optionally include a filler wetting agent. A filler wetting agent generally may help make the filler and the polyolefin dispersion more compatible. Useful wetting agents include phosphate salts, such as sodium hexametaphosphate. A filler wetting agent can be included in a composition of the present invention at a concentration of at least about 0.5 part per 100 parts of filler, by weight.

In a specific embodiment, a polyolefin dispersion is applied to a carpet using any application method known to those skilled in the art. For example, the dispersion can be applied directly, such as with a roll over roller applicator, or a doctor blade. Alternatively, the dispersion can be applied indirectly, such as with a pan applicator. Preferably, a roll over roller applicator is used with the top roller turning at about 22 to about 27 percent of line speed (e.g., percent of line speed).

The amount of dispersion applied and the concentration of the particles can be varied depending on the desired processing and product parameters. Preferably, the amount of dispersion applied and the concentration of the particles are selected so as to apply between about 4 and about 12 ounces per square yard (OSY) (about 141.5 and about 424.4 cm$^3$/m$^2$) of carpet. Most preferably, this is achieved by using a dispersion containing about 50 weight percent polyolefin particles (based on the total weight of the dispersion) and applying between about 8 and about 10 OSY (about 283 and about 353.7 cm$^3$/m$^2$) of the dispersion.

Polyolefin precoats, laminate coats, and foam coats can be prepared by methods known to those of ordinary skill in the art of preparing such backings. Precoats, laminate coats and foam coats prepared from dispersions are described in P. L. Fitzgerald, "Integral Dispersion Foam Carpet Cushioning", J. Coat. Fab. 1977, Vol. 7 (pp. 107-120), and in R. P. Brentin, "Dispersion Coating Systems for Carpet Backing", J. Coat. Fab. 1982, Vol. 12 (pp. 82-91).

When preparing foams, it is often preferred to froth the dispersion. Preferred in the practice of this invention is the use of a gas as a frothing agent. Examples of suitable frothing agents include: gases and/or mixtures of gases such as, air, carbon dioxide, nitrogen, argon, helium, and the like. Particularly preferable is the use of air as a frothing agent. Frothing agents are typically introduced by mechanical introduction of a gas into a liquid to form a froth. This technique is known as mechanical frothing. In preparing a frothed polyolefin backing, it is preferred to mix all components and then blend the air or gas into the mixture, using equipment such as an OAKES, MONDO or FIRESTONE frother.

Surfactants useful for preparing a stable froth are referred to herein as foam stabilizers. Foam stabilizers are useful in the practice of the present invention. Those having ordinary skill in this field will recognize that a number of foam stabilizers may be used. Foam stabilizers can include, for example, sulfates, succinamates, and sulfosuccinamates.

In one embodiment of the present invention, a polyolefin dispersion is formed. Next, the dispersion is frothed, which may, for example, be done by mechanically mixing with air. The frothed dispersion is then spread onto a carpet.

According to another aspect of the present invention, a method for manufacturing a carpet comprises scattering thermoplastic OBC powder on an upwardly faced lower surface of an upper surface member, heating the thermoplastic resin powder into melted thermoplastic resin, placing a nonwoven fabric on the upwardly faced lower surface of the upper surface member via the melted thermoplastic resin, and pressing said nonwoven fabric and the upper surface member in a laminated state to thereby integrally secure the nonwoven fabric and the upper surface member via an air permeable resin layer.

If the thermoplastic OBC powder is scattered onto the nonwoven fabric, some of the powder may enter the inside of the nonwoven fabric at the time of melting the powder. In the aforementnioned method, however, since the thermoplastic resin powder is scattered onto the upper surface member and then melted, the powder can be effectively prevented from entering into the upper surface member. Accordingly, the upper surface member and the nonwoven fabric can be secured appropriately. Furthermore, since the powder is heated in the state in which the nonwoven fabric is not disposed thereon, the powder can be melted efficiently, resulting in excellent productivity. Furthermore, the sequence of these processes may be performed continuously, which further enhances the productivity. Alternative to using an oven as means to melt the thermoplastic powder alternative heating method are possible such as the use of a double band press, etc.

It is preferable that the particle size of the thermoplastic resin powder falls within the range of 90 to 10,000 microns and that the scattering amount of the thermoplastic resin powder falls within the range of 5 to 500 g/m$^2$. By setting the particle size and the scattering amount as set forth, the carpet for use in vehicles according to the first aspect of the present invention can be manufactured assuredly. In other words, it is possible to assuredly manufacture a carpet for use in vehicles in which the air permeability of the entire carpet in a thickness direction thereof falls within the range of 1 to 50 cm$^3$/cm$^2$.

Furthermore, in the aforementioned manufacturing method, it is preferable that the melt flow rate value of the thermoplastic resin powder is 2 to 520. In this case, it is possible to more assuredly manufacture a carpet for use in vehicles in which the air permeability of the entire carpet in a thickness direction thereof falls within the range of 1 to 50 cm$^3$/cm$^2$.

Suitable thermoplastic powder based on OBC can be produced by grinding or cryogenic grinding or by thermoplastic micropelletization. Suitable powder with a particle size below 500 micron can be obtained which is storage stable.

After application of the dispersion, heat is applied to the back side of the primary backing so as to dry the dispersion and to at least partially melt the particles.

As a result, the loops of yarn are fixed to the primary backing. Preferably, the heat is applied by passing the product through an oven. Such an oven is preferably set at a temperature between about 65 and about 150° C. and the product spends between about 2 and about 5 minutes passing through the oven. Also, since the object is to at least partially melt the particles, the temperature of the oven is set at between about 5 and about 75° C. above the Vicat softening point of the polyolefin particles.

After treatment with the dispersion of polyolefin particles, the carpet may be used as is or, more preferably, may have an additional backing applied thereto. Additional backings can be applied by various methods with the preferred method, as described above, involving the use of an extruded sheet of a thermoplastic material, preferably the olefin block copolymer, especially ethylene based block copolymers described above, onto which a conventional secondary backing is laminated. In particular, a molten thermoplastic material is preferably extruded through a die so as to make a sheet which is as wide as the carpet. The molten, extruded sheet is applied to the back side of the primary carpet backing. Since the sheet is molten, the sheet will conform to the shape of the loops of yarn and further serve to fix the loops in the primary backing. Extrusion coating configurations include a monolayer T-type die, single-lip die coextrusion coating, dual-lip die coextrusion coating, and multiple stage extrusion coating. Preferably, the extrusion coating equipment is configured to apply a total coating weight of between about 4 and about 30 ounces/yd$^2$ (OSY) (about 141.5 and about 1061.1 cm$^3$/m$^2$).

Measured another way, the thickness of an unexpanded, collapsed extrusion coated adhesive backing material is in the range from about 6 to about 80 mils, preferably from about 10 to about 60 mils (about 0.25 to about 1.52 mm), more preferably from about 15 to about 50 mils (about 0.38 to about 1.27 mm), and most preferably from about 20 to about 40 mils (about 0.51 to about 1.02 mm).

The line speed of the extrusion process will depend on factors such as the particular polymer being extruded, the exact equipment being used, and the weight of polymer being applied. The line speed is typically varying between about 18 and about 250 ft./min. (about 5.5 and about 76.2 m/min.).

The extrusion coating melt temperature principally depends on the particular polymer being extruded. When using the most preferred ethylene block interpolymer described above, the extrusion coating melt temperature is greater than about 450° F. (232° C.), preferably greater than or equal to about 500° F. (about 260° C.), or is between about 450° F. (about 232° C.) and about 650° F. (about 343° C.), more preferably between about 475° F. (about 246° C.) and about 600° F. (about 316° C.), most preferably between about 500° F. and about 550° F. (about 260° and about 288° C.).

Preferably, two layers of resin, each layer comprising a different resin, are extruded with the layer applied directly onto the backside of the primary backing material (first layer) having a higher melt index than the second layer which is applied onto the backside of the first layer. Since it is the first layer which is relied on to encapsulate and penetrate the yarn, this layer should have a melt index high enough (melt viscosity low enough) to promote encapsulation and penetration of the yarn. The second layer, which is generally not relied on to encapsulate and penetrate the yarn, may be used either as the bottom surface of the carpet or to facilitate the application of an optional secondary backing material. For both of these uses, it is preferred to have a lower melt index to provide higher strength after cooling. In addition, because it is not relied on for encapsulating or penetrating the fiber bundles, a resin of lower quality and/or less tightly controlled properties may be used in the second layer. In a preferred embodiment, the second layer is a recycled feedstock.

Also, the first and second layers may consist of different polymer chemistries or compositions. For example, the first layer can be comprised of an adhesive polymer (as an additive or as the composition of the entire layer) such as, but not limited to, an ethylene vinyl acetate copolymer, an ethylene acrylic acid copolymer or a maleic anhydride/ethylene polymer graft (preferably, a ethylene block inter polymer/maleic anhydride extrusion graft or a high density polyethylene/maleic anhydride extrusion graft) and the second layer can be comprised of a non-polar polymer such as a olefin block copolymer, especially ethylene based block copolymers, a low density polyethylene or ultra low density polyethylene.

Alternatively, the first layer can be comprised of a non-polar polymer and the second layer can be comprised of an adhesive polymer. Preferably, the first layer has an $I_2$ melt index between about 5 and about 175 g/10 minutes and the second layer has an $I_2$ melt index between about 1 and about 70 g/10 min. Most preferably, the first layer has an $I_2$ melt index between about 30 and about 70 g/10 minutes and the second layer has an $I_2$ melt index between about 10 and about 30 g/10 min. It is also preferred to extrude two layers of a single polymer composition so as to have greater control over the thickness or weight of the resin applied to the carpet.

In alternative embodiments, three or more layers of the resin can be extruded on the back surface of the primary backing material to achieve even higher coat weights and/or to obtain a more gradual transition between the first and last layer applied. Preferably, a dual lip die is used to apply two layers. Alternatively, two or more extrusion stations or a single lip coextrusion die can be used to apply these two or more layers.

Another aspect of the present invention is the use of modified olefin block copolymer, especially ethylene based block interpolymers. In particular, in certain aspects of the invention the at least one olefin block copolymer, especially ethylene based block copolymers that is employed as the adhesive backing material, primary backing material or yarn, preferably as the adhesive backing material, is modified by the addition of at least one adhesive polymeric additive. Suitable adhesive polymeric additives include polymer products comprised of (1) one or more ethylenically unsaturated carboxylic acids, anhydrides, alkyl esters and half esters, e.g., acrylic acid, methacrylic acid, maleic acid, maleic anhydride, itaconic acid, fumaric acid, crotonic acid and citraconic acid, citraconic anhydride, succinnic acid, succinnic anhydride, methyl hydrogen maleate, and ethyl hydrogen maleate; esters of ethylenically unsaturated carboxylic acids, e.g., ethyl acrylate, methyl methacrylate, ethyl methacrylate, methyl acrylate, isobutyl acrylate, and methyl fumarate; unsaturated esters of carboxylic acids, e.g., vinyl acetate, vinyl propionate, and vinyl benzoate; and ethylenically unsaturated amides and nitriles e.g., acrylamide, acrylonitrile, methacrylonitrile and fumaronitrile; and (2) one or more ethylenically unsaturated hydrocarbon monomers such as aliphatic a-olefin monomers, e.g., ethylene, propylene, butene-1 and isobutene; conjugated dienes, e.g., butadiene and isoprene; and monovinylidene aromatic carbocyclic monomers, e.g., styrene, (X-methylstyrene, toluene, and t-butylstyrene. Suitable adhesive polymeric additives can be conveniently prepared by known techniques such as, for example, by interpolymerization or by a polymerization procedure followed by a chemical or extrusion grafting procedure. Suitable grafting techniques are described in U.S. Pat. Nos. 4,762,890; 4,927,888; 4,230,830; 3,873,643; and 3,882,194, the disclosures of each incorporated herein in its entirety.

Preferred adhesive polymeric additives for use in the present invention are maleic anhydride grafts wherein maleic anhydride is grafted onto an ethylene polymer at a concentration of about 0.1 to about 5.0 weight percent, preferably about 0.5 to about 1.5 weight percent. The use of ethylene polymer/maleic anhydride grafts as adhesive polymeric additives in the present invention significantly improves the performance and operating window of extrusion coated olefin block copolymer, especially ethylene based block interpolymers as the adhesive backing material, especially for polar polymer such as for example, but not limited to, nylon and polyester faced carpets. The improvement pertained to substantially higher comparative abrasion resistance and tuft bind strength. The improvement was surprising in that graft adhesives are generally known to require extended molten or semi-molten contact times for improved performance and function as interlayer adhesives for films and coatings where there is a continuous substrate as opposed to the discontinuous interface existent in carpet construction.

Preferred ethylene polymers for use as the grafted host polymer include low density polyethylene (LDPE), high density polyethylene (HDPE), heterogeneously branched linear low density polyethylene (LLDPE), homogeneously branched linear ethylene polymers and substantially linear ethylene polymers. Preferred host ethylene polymers have a polymer density greater than or equal to 0.915 g/cc and most preferably greater than or equal to 0.92 g/cc. Ethylene based block interpolymers and high density polyethylene are the preferred host ethylene polymers.

In this aspect of the present invention, the adhesive polymeric additive is added to the olefin block copolymer, especially ethylene based block copolymers, at a level in the range of from about 0.5 to about 30 weight percent, preferably from about 1 to about 20 weight percent, more preferably from about 5 to about 15 weight percent based on the total weight of the polymer. For the preferred ethylene polymer maleic anhydride grafts, additions should provide a final maleic anhydride concentration in the range of from about 0.01 to about 0.5 weight percent, preferably from about 0.05 to about 0.2 weight percent based on the total weight of the polymer.

Auxiliary equipment such as a pre-heater can be used. In particular, a heater, such as a convection oven or infrared panels can be used to heat the back of the greige good before the adhesive backing material is extruded thereon. In doing so, it has been found that the encapsulation and penetration of the yarn bundles can be enhanced. Preferably, the pre-heater is an infrared unit set at between about 200 and about 1500° C. and the greige good is exposed to this heating for between about 3 and about 30 seconds. Most preferably, the heater is set at about 1000° C. and the greige good is exposed to this heating for about 5 to about 7 seconds (e. g., 6 seconds).

In addition to or as an alternative to pre-heating, the process of the invention may also employ a post-heat soaking process step to lengthen the molten time for the adhesive backing material to thereby improve the encapsulation and penetration of the yarn or fiber bundles by the adhesive backing material. Preferably, after the adhesive backing material is applied to the greige good, it is heated by a convection oven or infrared radiation at a temperature between about 200 and about 1500° C. for between about 3 and 30 seconds, most preferably at 1000° C. for about 5 to about 7 seconds (e.g., 6 seconds).

As another piece of auxiliary or optional equipment, a vacuum nip roll can be used to draw the adhesive backing material extrudate (i.e., semi- molten or molten polymer web) onto the greige good. In a properly configured extrusion coating operation, the pile face of the greige good is positioned towards the vacuum nip roll and the polymer web is draw down onto the back surface of the primary backing material of the greige good. Vacuum nip roll 24 (which is illustrated in FIG. 2 and is available from Black Clawson Corporation) is suitable for vacuum drawing the adhesive backing material web. Vacuum nip roll 24 can be adapted from a conventional nip roll wherein a portion of the hollow internal of the roll is partitioned, dedicated and coupled to an external vacuum pump 27 to provide a vacuum surface. The surface of the vacuum portion is perforated but machined flush and continuously with the remaining surface of the roll. Suitable vacuum nip rolls can have a complete 360 degree vacuum surface; however, a vacuum surface of from about 10 to about 180 degrees is preferred, most preferably about 60 degrees. To effectively draw the adhesive backing material web onto the greige good and maximize to the penetration of the yarn or fiber bundles, the vacuum is set to greater than 15 inches of $H_2O$ (3.7 Pa), preferably greater than or equal to 25 inches of $H_2O$ (6.1 Pa) and more preferably greater than or equal to 40 inches of $H_2O$ (9.8 Pa), or from between about 15 and about 50 inches of $H_2O$ (about 3.7 and about 12.3 Pa), preferably from between about 20 and about 45 (about 4.9 and about 11.1 Pa).

The length of time the greige good is actually subjected to the vacuum will primarily depend on the extrusion coating line speed and the extent of draw on the adhesive backing material web will largely depend on the level of vacuum and the porosity of the greige good. As such, higher vacuum levels will be required for higher extrusion coating line speeds and/or denser greige good to effectively the draw the adhesive backing material.

In addition to or as an alternative to a vacuum nip roll, a high pressure positive air device such as an air blade or knife can also be used to force the adhesive backing material web onto the back surface of the primary backing material. Preferably, the positive air pressure device is set to provide an air pressure greater than 20 psi (0.14 MPa), preferably greater than or equal to 40 psi (0.27 MPa), more preferably greater than or equal to 60 psi (0.41 MPa), or between about 20 and about 120 psi (about 0.14 and about 0.82.MPa), most preferably between about 30 and about 80 psi (about 0.20 and about 0.54 MPa) Preferably, the positive air pressure device is positioned at the extrusion coating nip, extends across the entire width of the polymer web and is positioned behind the polymer web towards the chill roll so to force the polymer web onto the greige good and press the polymer web into the yarn or fiber bundles.

The extruded polymer(s) can either be used neat, or can have one or more additive included. A preferred additive is an inorganic filler, more preferably, an inorganic filler with a high heat content. Examples of such fillers include, but are not limited to, coal fly ash, calcium carbonate, aluminum trihydrate, talc, barite. High heat content fillers are believed to be advantageous in the invention because such fillers allow the extrudate to remain at elevated temperatures longer with the beneficial result of providing enhanced encapsulation and penetration. That is, normally fillers are added to carpet backing materials to merely add bulk (i.e. as extenders) or to impart insulating and sound dampening characteristics. However, we have found that inorganic mineral fillers that have high heat contents surprisingly improve yarn encapsulation and penetration which in turn improves the performance of the abrasion resistance and tuft bind strength of extrusion coated carpet samples.

Preferably, a high heat content filler is added at a level of between about 1 and about 75 weight percent of the total extrudate, more preferably between about 15 and about weight percent and most preferably between about 20 weight percent and 50 weight percent. Such fillers will have a specific heat content of greater than or equal to 0.4 cal-cc/° C. (1.8 Joules-cc/° C.), preferably greater than or equal to 0.5 cal-cc/° C. (2 Joules-cm$^3$/° C.), more preferably greater than or equal to 0.6 cal-cc/° C. (2.5 Joules-cm$^3$/° C.), and most preferably greater than or equal to about 0.7 cal-cc/° C. (2.9 Joules-cm$^3$/° C.). Representative examples of high heat content fillers for use in the present invention include, but are not limited to, limestone (primarily $CaCO_3$), marble, quartz, silica, and barite (primarily $BaSO_4$). The high heat content fillers should be ground or precipitated to a size that can be conveniently incorporated in an extrusion coating melt stream. Suitable particle sizes range from about 1 to about 100 microns. If a foamed backing is desired on the carpet, a blowing agent can be added to the adhesive backing material and/or the optional secondary backing material. If used, the blowing agents are preferably conventional, heat activated blowing agents such as azodicarbonamide, toluene sulfonyl semicarbazide, and oxy bis(benzene sulfonyl) hydrazide. The amount of blowing agent added depends on the degree of foaming sought. A typical level of blowing agent is between about 0.1 and about 1.0 weight percent.

Implosion in the present invention is accomplished by restricting expansion of the adhesive backing material in the direction opposite the primary backing material during activation of the implosion agent such that the molten polymer is forced into the interior and free space of the yarn or fiber bundles. An imploded adhesive backing material will have a collapsed, non-expanded matrix (relative to a foamed backing) and be of essentially the same thickness (measured from the plane of the back surface of the primary backing material) as would be the case without the use of the implosion agent. That is, the adhesive backing material layer would be characterized as not being expanded by the implosion agent.

The implosion agent is selected and formulated into the adhesive backing material and extrusion conditions are set such that the activation of the implosion agent occurs at the instant of nip while the adhesive backing material is still semi-molten or molten. With improved yarn penetration accomplished with the use of an implosion agent, the carpet will exhibit comparatively improved abrasion resistance.

Thus, the use of an implosion agent can allow the use of polymer compositions having lower molecular weights to provide improved extrusion coatability yet maintain higher abrasion resistance (i.e., comparable to adhesive backing materials based on higher molecular weight polymer compositions). An effective amount of implosion agent would be between about 0.1 and about 1.0 weight percent based on the weight of the adhesive backing material.

Conventional blowing agents or any material that ordinarily functions as a blowing agent can be used as an implosion agent in the present invention providing expansion of the adhesive backing material matrix is suitably restricted or confined when the material is activated such that molten polymer is forced into the interior and free space of the yarn or fiber bundles and there is no substantial expansion of the adhesive backing material as a result of having used the implosion agent. However, preferably, an imploded adhesive backing material will be characterized as having a closed cell structure that can be conveniently identified by photomicrographs at 50× magnification. Other additives can also be included in the adhesive backing material, to the extent that they do not interfere with the enhanced properties discovered by Applicants. For example, antioxidants such as sterically hindered phenols, sterically hindered amines and phospites may be used. Suitable antioxidants include Irganox™ 1010 from Ciba-Geigy which is a hindered phenol and Irgafos™ 168 from Ciba-Geigy which is a phosphite. Other possible additives include antiblock additives, pigments and colorants, antistatic agents, antimicrobial agents (such as quaternary ammonium salts) and chill roll release additives (such as fatty acid amides).

As noted above, and shown in FIG. 2, the carpet of the invention preferably also includes a secondary backing material. Preferably, the secondary backing material is laminated directly to the extruded layer(s) while the extrudate is still molten after extrusion coating. It has been found that this technique can improve the penetration of the extrusion coating into the primary backing.

Alternatively, the secondary backing material can be laminated in a later step by reheating and/or remelting at least the outermost portion of the extruded layer or by a coextrusion coating technique using at least two dedicated extruders. Also, the secondary backing material can be laminated through some other means, such as by interposing a layer of a polymeric adhesive material between the adhesive backing material and the secondary backing material.

Suitable polymeric adhesive materials include, but are not limited to, ethylene acrylic acid (EAA) copolymers, ionomers and maleic anhydride grafted polyethylene compositions.

Figure 3:
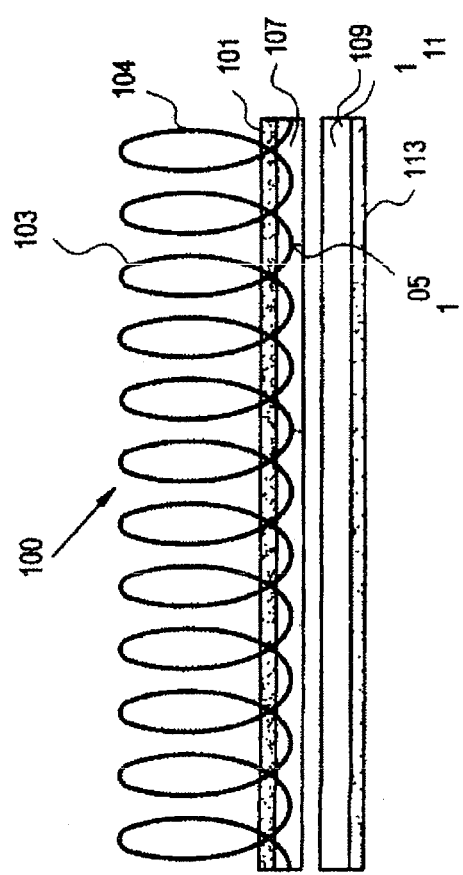
FIG. 3 is a cross-section showing the construction of a carpet tile in accordance with the present invention.

The extrusion backed carpet construction and the methods described herein are particularly suited for making carpet tile. FIG. 3 shows a cross-section of a carpet tile made according to the present invention. A yarn 103, preferably made of polypropylene, is tufted into a primary backing 101, which is also preferably made of polypropylene, so as to leave a carpet pile face 104 on top of the primary backing 101 and back stitches 105 below the primary backing.

Applied to the back of the primary backing 101 and the back stitches 105 is an adhesive layer 107, also often referred to as the "precoat" layer. Preferably, this adhesive layer is made from a polyolefin. More preferably, the adhesive layer is made from the ethylene polymers described in detail above.

In a preferred embodiment of carpet tile, the carpet included from about 5 to about 200 OSY (about 176.8 to about 7,074 $cm^3/m^2$) of extruded adhesive backing. More preferably, the carpet for tile includes from about 30 to about 80 OSY (about 1061 to about 2,830 $cm^3/m^2$) of extruded backing, most preferably, 50 OSY (1,768 $cm^3/m^2$) Preferably, the carpet for carpet tile receives its extruded backing in two passes, i.e., to apply two layers of the extruded backing. The first pass applies the layer 107 in FIG. 3. Preferably this layer 107 is between about 2.5 and about 100 OSY (about 88.4 to about 3,537 $cm^3/m^2$) of the extruded polymer, more preferably between about 15 and about OSY (about 530.5 to about 1, 415 $cm^3/m^2$), and most preferably 25 OSY (884 $cm^3/m^2$). The second pass adds the layer 111. Preferably the second layer 111 is about 2.5 and about 100 OSY (about 88.4 to about 3,537 $cm^3/m^2$), more preferably between about 15 and 40 OSY (about 530.5 to about 1,415 $cm^3/m^2$), and most preferably 25 OSY (884 $cm^3/m^2$). Applying the extruded backing in two passes allows the opportunity to apply a first and second layer which have different physical and/or chemical properties. As noted above, it is sometimes preferable to apply a polymer with a higher melt index adjacent the primary backing, and a polymer with a lower melt index below that. In addition, it can also be preferably to use an extrudate with a lower filler content in the layer next to the primary backing and an extrudate with a higher filler content in the layer below that. In one preferred embodiment, the layer next to the primary backing includes a filler loading of 30 percent by weight and the layer below that includes a filler loading of 60 percent by weight. The lower filler content is believed to provide better penetration of the primary backing and back stitches in the carpet by the extrudate.

The carpet tile may include a secondary backing fabric 113 below the second layer of extruded backing 111. Suitable materials for the secondary backing fabric include those described above. However, it is presently not preferred to include a secondary backing fabric on carpet tile.

Figure 4:
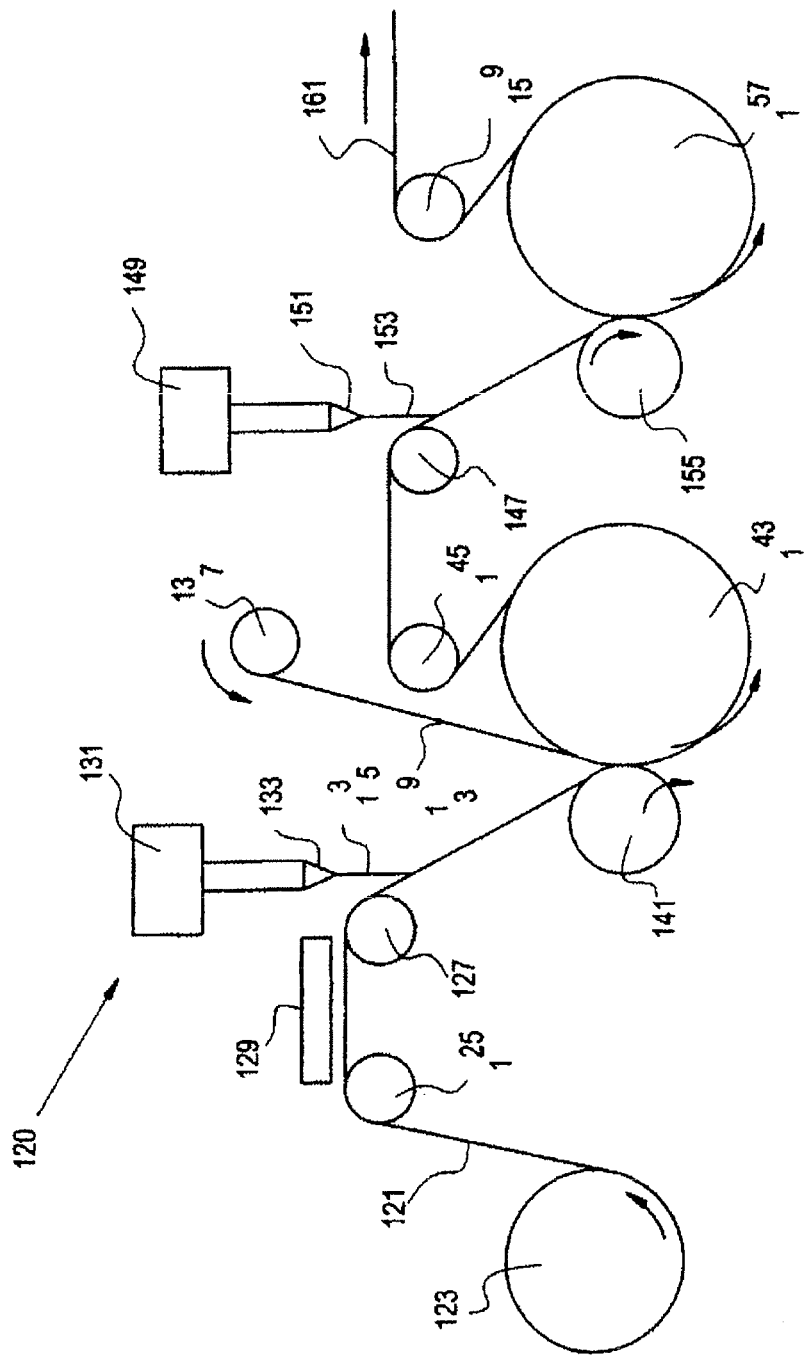
FIG. 4 and FIG. 5 are schematic representations of an extrusion coating line for making carpet tile according to the present invention.

FIG. 4 schematically shows a preferred line 120 for making carpet tile according to the present invention. A length of greige good 121, i.e. yarn tufted into a primary backing, is unrolled from the roll 123. The greige good 121 passes over the rollers 125 and 127 with the primary backing toward the roller 123. Between rollers 125 and 127 is a pre-heater 129 as described above. An extruder 131 is mounted so as to extrude a sheet 135 of the polymeric backing through the die 133 onto the back of the greige good at a point between the roller 127 and the nip roll 141. The exact location at which the sheet 135 contacts the greige good can be varied depending on the line speed and the time desired for the molten polymer to rest on the greige good before passing between the nip roll 141 and the chill roll 143.

When making carpet tile, it is preferable to embed a layer of reinforcing material 109 between the first and second layers of extruding backing. An important property of carpet tile is dimensional stability, i.e., the ability of the tile to maintain its size and flatness over time. The inclusion of this layer of reinforcing material has been found to enhance the dimensional stability of carpet tile made according to this preferred embodiment. Suitable reinforcing materials include dimensionally and thermally stable fabrics such as non-woven or wet-laid fiberglass scrims, as well as woven and non-woven thermoplastic fabrics (e.g. polypropylene, nylon and polyester). Most preferably, the reinforcement layer is a polypropylene non-woven fabric sold by Reemay as "Typar" with a basis weight of 3.5 OSY (124 cm 3/m2). Alternatively, a preferred reinforcement layer is a fiberglass scrim sold by ELK Corp. as "Ultra- Mat:" with a basis weight of 1.4 OSY (49.5 cm 3/m2).

The pressure between the nip roll 141 and the chill roll 143 can be varied depending on the force desired to push the extruded sheet. Also, as described in connection with FIG. 2, it may be desirable to include a vacuum slot in the nip roll. In addition, a jet of pressurized air may also be used to push the extruded sheet into the carpet backing.

After passing over the chill roll 143, the carpet is brought over rollers 145 and 147 with the carpet pile toward the rollers. A second extruder 149 extrudes a sheet of polymer 153 through its die 151 on to the back of the scrim 139. Again the point at which the extruded sheet 153 contacts the scrim 139 can be varied as described above.

At this point, if a secondary backing fabric is desired for the carpet tile, that fabric can be introduced from a roll similar to that shown at 137 so as to contact the be laminated to the carpet through the extruded sheet 153 as it passes between the nip roll 155 and the chill roll 157. Such a secondary backing fabric is not currently preferred for carpet tile construction.

While the apparatus shown in FIG. 4 is preferred for making a carpet tile with two layers of extruded backing and a reinforcing fabric in between, the same construction can be made with a single extrusion die, nip roll and chill roll. In particular, the first layer of extruded backing and the reinforcing fabric can be applied in a first pass through the line after which the carpet is rolled up. The second layer of extruded backing can be applied on top of the reinforcing fabric in a second pass through the same line after which the carpet is ready to be cut into carpet tiles.

Figure 5:
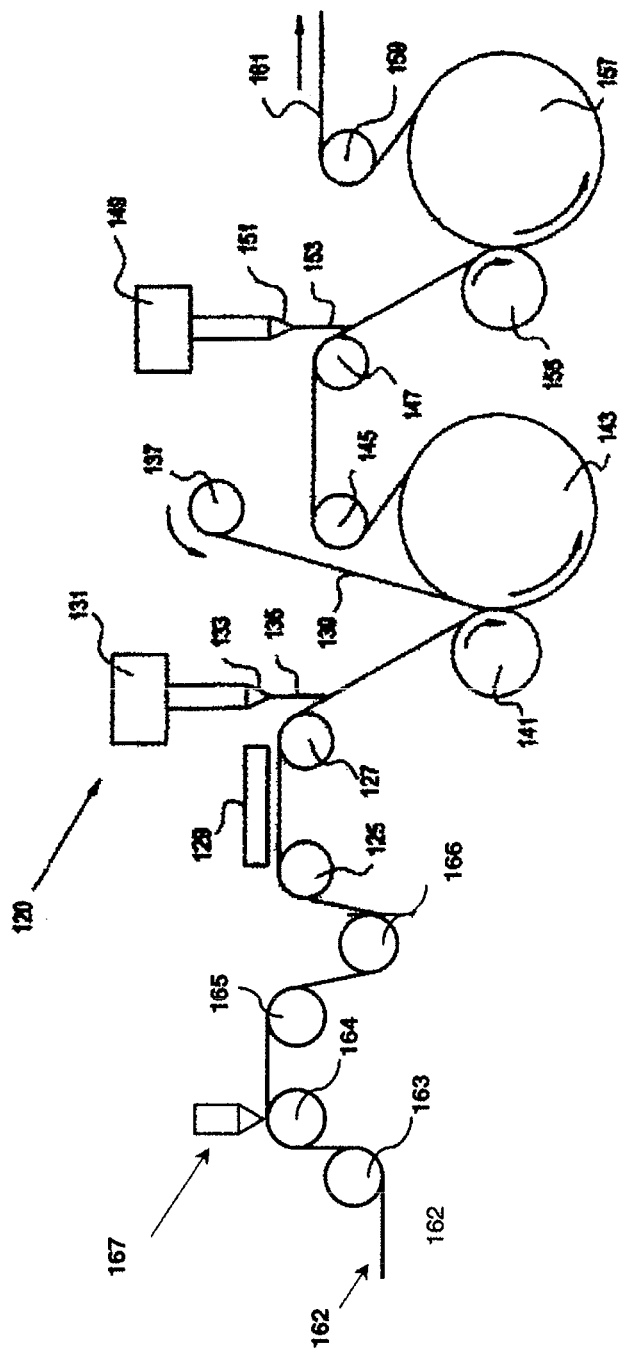

The carpet tile may include a secondary backing fabric 113 below the second layer of extruded backing 111—see FIG. 3. However, it is presently not preferred to include a secondary backing fabric on carpet tile. FIGS. 4 and 5 schematically shows a preferred line 120 for making carpet, the carpet comprising a primary backing material having a face and a back side, a plurality of fibers attached to the primary backing material and extending from the face of the primary backing material and exposed at the back side of the primary backing material, a precoat, an adhesive backing material, an optional dimensional stability layer, and an optional secondary backing material adjacent to the dimensional stability layer or adhesive backing material, wherein at least one of the plurality of fibers, the primary backing material, the precoat layer, the adhesive backing material, the optional dimensional stability layer, or the optional secondary backing material comprises at least one olefin block copolymer according to the present invention.

Again, while the apparatus shown in FIGS. 4 and 5 is preferred for making a carpet tile with two layers of extruded backing and a reinforcing fabric in between, the same construction can be made with a single extrusion die, nip roll and chill roll.

Carpet tile is typically made by producing a length of backed carpet and then cutting the carpet into the appropriate sized squares. In the United States, the most common size is 18 inches (45.7 cm) square. In the rest of the world, the most common size is 50 cm square.

Carpet tiles have a tendency to grow in hot, humid environments. This is a significant problem as the tiles are installed edge-to-edge with no room for expansion. Buckling of the tile system can occur even if expansions are as low as 0.08%. The amount of growth in tiles is related to the inherent growth of the various layers of the tile. The yarn is often made of nylon which is known to swell upon exposure to humid environments. This swelling is often arrested by the pre-coat which can hold the pre-coated carpet composite in place at most all temperatures seen in the application. However, issues can arise if the backing or the adhesive or cap coat layers expand upon exposure to heat. For this reason, layers of fiberglass nonwoven are often imbedded in between the adhesive and cap coat layers. However, despite such efforts tiles are known to grow due to the inherent growth of that polymer. Coefficient of Linear Thermal Expansion (CLTE or CTE) is a measure of this growth tendency.

The CLTE is only one part of the prediction of growth of polymeric backing layers in carpet tiles. This is because the classical measurement of CLTE is done with little or no force applied upon the sample. Particularly with soft materials such as those used for carpet backing, the even small forces applied to the sample by testing devices such as dilatometers and TMA devices can alter the growth measured. Growth can occur in either the X (cross), Y (machine) or Z (thickness) direction. In the case of the actual carpet tile, the X and Y directional growth is limited by the pre-coated carpet, the imbedded glass layer and the floor to which it is adhered. These constraints tend to force the thermal expansion of the adhesive and cap coats into the Z-direction, which is the "path of least resistance". The degree to which this occurs related to the amount of force with which a material grows, hereafter called "growth tension". Such soft materials with a high growth tension will expand more in the X and Y directions than materials with low growth tensions.

The growth tension can be measured in the following manner.

Growth Tension Measurement

Growth tension is measured using a TA Instrument RSA III (Rheometric Solids Analyzer III). Extruded sheets are cut into 20 mm×12.7 mm rectangular shape and loaded into the instrument. During the test, the strain and tension are set so that the clamp distance is fixed. A temperature ramp is programmed to run from room temperature until melting at 20° C./min. The force is recorded during the temperature ramp, from which the growth tension is calculated according to Equation 1. Positive force registers with growth tendency and negative force registers shrinking tendency.

$$\sigma(MPa) = \frac{F}{Area} = \frac{F(gf)*0.0098\ (N/gf)}{t(mm)*W(mm)} \quad (1)$$

in which σ is the growth tension, F is the shrink force, Area is the film cross-sectional area, t is the film thickness, and W is the film width.

TABLE

| list of area under growth tension curve between 25° C. and 40° C. | | |
|---|---|---|
| | MD (psi-° C.) | CD (psi-° C.) |
| Comparative Ex. 1 | 55.4 | 70.4 |
| Example 1 | 40.4 | 41.6 |
| Example 2 | 49.7 | 58.8 |
| Example 3 | — | 46.8 |

MD = machine direction; CD = cross direction

Comparative example 1 is a formulation comprising 24 weight percent of a substantially linear ethylene/1-octene copolymer having a melt index of about 30 g/10 minutes and a density of about 0.885 g/cm$^3$, about 4 weight percent of AMPLIFY GR 204, which is an ethylene polymer having a melt index of 65 g/10 minute and a density of about 0.952 g/cm$^3$, subsequently grafted with maleic anhydride to about 1.2 weight percent maleic anhydride and a final melt index of about 12 g/10 minutes, about 60 weight percent filler, about 1 weight percent oil (Chevron/Phillips Paralux 600 1 R) and about 11 weight percent tackifier (see example from top of column 59 of U.S. Pat. No. 7,338,698).

Example 1 is a formulation comprising 39 weight percent of an ethylene/1-octene multiblock copolymer having a melt index of about 5 g/10 minutes and a density of about 0.887 g/cm$^3$, about 60 weight percent coal ash, and about 1 weight percent oil (Chevron/Phillips Paralux 600 1 R). Example 2 is a formulation comprising 31.2 weight percent of an ethylene/1-octene multiblock copolymer having a melt index of about 5 g/10 minutes and a density of about 0.877 g/cm$^3$, about 7.8 weight percent of a high pressure low density ethylene polymer having a melt index of 8 g/10 minute and a density of about 0.918 g/cm$^3$, about 60 weight percent coal ash, and about 1 weight percent oil (Chevron/Phillips Paralux 600 1 R). Example 3 is a formulation comprising 23.2 weight percent of an ethylene/1-octene multiblock copolymer having a melt index of about 15 g/10 minutes and a density of about 0.877 g/cm$^3$, about 5.8 weight percent of a high pressure low density ethylene polymer having a melt index of about 8 g/10 minute and a density of about 0.918 g/cm$^3$, about 60 weight percent coal ash, about 1 weight percent oil (Chevron/Phillips Paralux 600 1 R) and about 10 weight percent tackifier Eastotac H100L.

Figure 6:
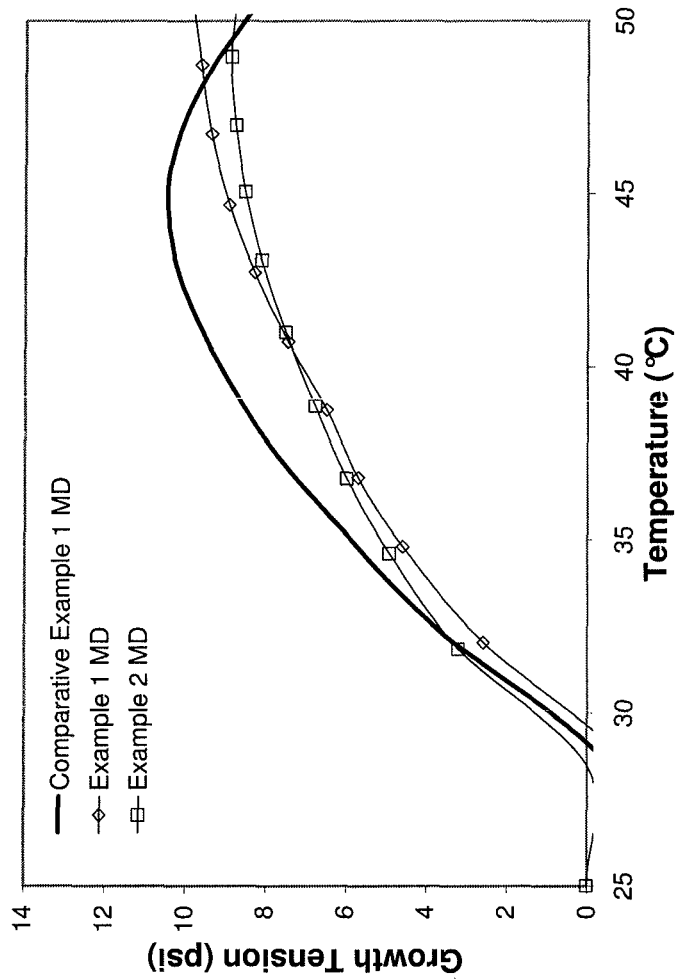
FIG. 6 and FIG. 7 are graphs of MD and CD growth tension (psi) versus temperature (° C.) for comparative example 1 and examples 1-3 of the invention.
Figure 7:
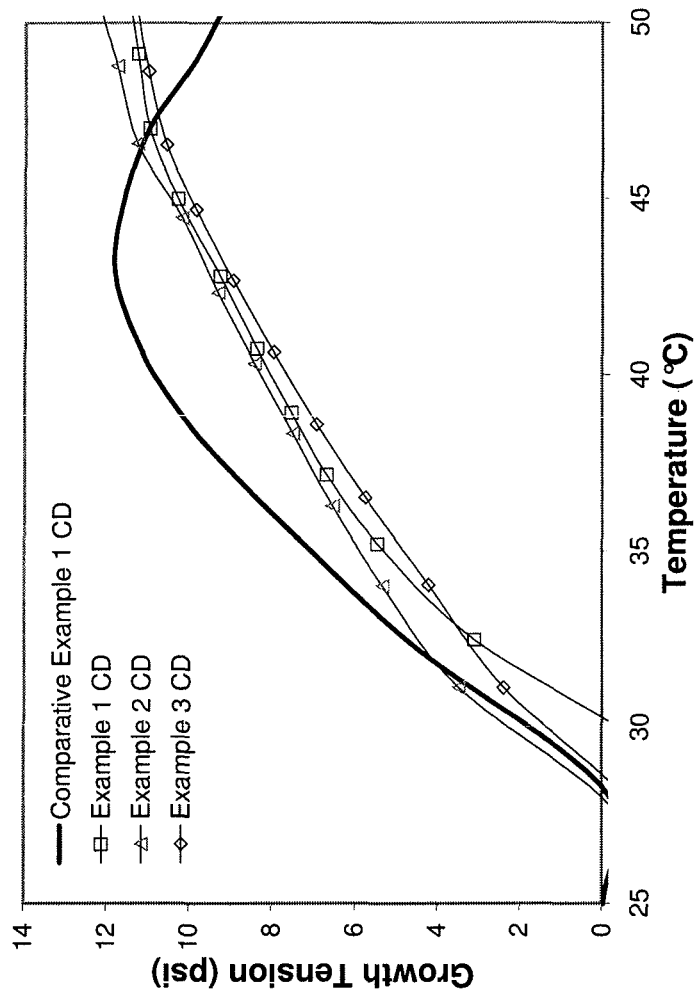

FIGS. 6 and 7 show the relationship between growth tension and temperature. As the figures show, the examples of the invention have lower growth tension, hence lower growth, over a range of temperatures, especially between 25° C. and 40° C., the temperature range typically seen in carpeted rooms having had the air conditioning turned off for a weekend. This means that the carpet or carper tile will show less buckle from experiencing less growth, whereas the comparative composition not containing the ethylene multiblock copolymer has poorer MD and CD growth characteristics. In particular, the compositions of the invention useful for making carpet and carpet tile comprising at least one olefin block copolymer, preferably at least one ethylene based multiblock copolymer, can have a growth tension versus temperature relationship such that the area under the curve for growth tension between 25° C. and 40° C. for an extruded sheet made from the composition in the machine direction of 52 (psi-° C.) or less, preferably 50 (psi-° C.) or less, more preferably 45 psi-° C.) or less and can be as low as about 10 (psi-° C.). In another embodiment, the compositions of the invention useful for making carpet and carpet tile comprising at least one olefin block copolymer, preferably at least one ethylene based multiblock copolymer, can have a growth tension versus temperature relationship such that the area under the curve for growth tension between 25° C. and 40° C. for an extruded sheet made from the composition in the cross direction of 65 (psi-° C.) or less, preferably 60 (psi-° C.) or less, more preferably 48 psi-° C.) or less and can be as low as about 10 (psi-° C.).

In still another alternative embodiment, a pressure sensitive adhesive is applied to the bottom surface of the backed carpet and a release sheet is included. In this way, a "Peel and stick" carpet is produced. This is particularly beneficial when the carpet is to be cut into tiles. Examples of suitable pressure sensitive adhesives include ethylene vinyl acetate copolymers and substantially linear ethylene polymers and ethylene-based multiblock polymers formulated with tackifiers and polymeric waxes. The release sheet can be made from conventional polymers and/or paper products. Preferably, the release sheet is made of polyester/wax formulation.

It has been determined that the pressure sensitive adhesive is best applied directly to the adhesive backing material while the adhesive backing material is still at an elevated temperature from the extrusion coating process. A preferred technique is to extrusion laminate the pressure sensitive adhesive with the adhesive backing material; that is, to apply the pressure sensitive adhesive at nip.

Alternatively, the adhesive backing material can be reheated before the pressure sensitive adhesive is applied.

Another preferred embodiment of the present invention, exclusive of an optional secondary backing material, involves the combination of the various process steps described herein together with the use of at least one substantially linear ethylene polymer with an effective amount of an implosion agent formulated therein in the first layer of a two layer adhesive backing material. The preferred combination of process steps at least includes precoating with an aqueous polyolefin system; removal of processing materials by washing or scouring the greige good with an aqueous detergent solution heated to at least 67° C.; drying and pre-heating the greige good by subjecting it to infra-red radiation set at about 1000° C. for about 1 to about 6 seconds; extrusion coating the adhesive backing material onto the back surface of the pre-heated, washed primary backing material by utilizing extrusion melt temperatures of greater than or equal to 615° F. (324° C.); subjecting the semi-molten or molten adhesive backing material web to a vacuum of greater than 40 inches H$_2$O (9.8 Pa) while at the extrusion coating nip; subjecting the semi-molten or molten adhesive backing 1 o material to a positive air pressure device set at greater than about 60 psi (0.41 MPa) at the extrusion coating nip; activating an implosion agent while at the extrusion coating nip; and heat soaking of the carpet by subjecting it to infra-red radiation set at about 1000° C. for about 1 to about 6 seconds. Various embodiments of the present invention were evaluated and, in specific instances, compared to prior art embodiments. However, the Examples shown should in no way limit the scope of the present invention to such Examples.

OBC is most compatible with fully hydrogenated tackifiers with molecular weights less than 2500 g/mol (Mz). Best tackifiers to use with OBC are: 1) hydrogenated aromatics such as Regalite R1090 and R1100 (made by Eastman Chemical), 2) fully hydrogenated hydrocarbons such as Eastotac H100L and the Escorez 5600 series, 3) partially hydrogenated hydrocarbons such as the Escorez 5400 series, and 4) hydrogenated pure monomer resins such as Regalrez 1085 and 1094.

Appropriate Oil: A selection of mineral and naphthenic oils were formulated with OBC Tackifier. Best candidates include Chevron-Phillips' Paralux 6001 (paraffinic), Ergon-West Virginia's Hyprene P100N (hydrotreated paraffinic), and Crompton-Witco's Kaydol and Sonneborn's Hydrobrite 550 mineral oils (62-67.5% paraffinic).

Appropriate Waxes: Waxes including waxes manufactured from crude oil refining, such paraffin wax, microcrystalline wax, and synthetic waxes, such as Fischer-Tropsch waxes Appropriate fillers:

Glass filler: Glass powder is typically produced by recycling post consumer glass products, in particular automotive and architectural glass, also known as plate glass. However, other types of glass, such as flint glass, E glass, borosilicate glass, brown glass (bottle glass), and green glass (bottle glass) and combinations thereof may also be used to form the glass powder. Therefore, to insure adequate dispersion of the glass powder in the filler, while maintaining adequate viscosities, the average size of the glass powder may range from approximately 100 mesh to 400 mesh. More particularly, in some embodiments, the average size of the glass powder may be approximately 200 mesh.

Other fillers: The glass powder may make up 100% of the filler. Additionally, the glass powder may be used in conjunction with conventional fillers to form a composite filler. For example, in some embodiments, the glass powder may be mixed with carbonates such as calcium carbonate ($CaCO_3$), cesium carbonate ($CsCO_3$), strontium carbonate ($StCO_3$), and magnesium carbonate ($MgCO_3$); sulfates such as barium sulfate ($BaSO_3$); oxides such as fly ash, iron oxide ($Fe_2O_3$), alumina oxide ($Al_2O_3$), tungsten oxide ($Tg_2O_3$), titanium oxide ($Ti_2O_3$), and silicon oxide ($Si_2O_3$); silicates, such as clay; metal salts; fly ash; and the like.

Surfactants: The adhesive compound may also include additional additives. For example, these additives may include a surfactant to help keep the filler uniformly dispersed in the adhesive. Suitable surfactants may include nonionic, anionic, and fluorosurfactants. In addition to uniformly dispersing the filler throughout the adhesive compound, the surfactants may also be used as a froth aid to increase the emulsification of adhesives.

Antioxidants: When polymer adhesives, especially hot melt adhesives, are heated, they may become susceptible to thermo-oxidation degradation. Therefore, to reduce the possibility of thermo-oxidation degradation, the adhesive composition of the present invention may also contain an antioxidant such as Irganox 1010, 1092, etc.

Appropriate ranges for PSA and HMA compositions:
Filler: 40-70%;
Tackifying Resin 20-40%;
Oil 0-10%;
OBC—balance to achieve 100%.

Polymers:

A number of different polymers may be used as the base component of adhesives in accordance with embodiments of the present invention, such as the olefin block copolymers, especially ethylene based block interpolymers. For example, ethylene vinyl acetate (EVA) based polymers may be used. The type and amount of wax and resin used with the EVA copolymer can control the set time and the residual tack of the adhesive. In some instances, filler may be added to EVA adhesives for special applications. Other embodiments of the present invention may use polyethylene-based polymers, polypropylene-based polymers, propylene-ethylene copolymers, amorphous poly alpha-olefins, polyamides, block copolymers, and/or other polymers known in the art. For example, ethylene ethyl acrylate (EEA), styrene-isoprene-styrene copolymers, styrene-butadiene-styrene copolymers, as well as a number of other styrene copolymers (SEBS, SEPS, etc.), polyurethane polyvinyl chloride, latex nitrile, acrylonitrile copolymers, acrylics (including pure acrylics as well as styrene acrylics and vinyl acrylics), and polyisobutylene may be used. In addition, polymers such as ethylene butyl acrylate (EnBA) and epoxydized polybutadiene (PBE) may be used. In preferred embodiments, synthetic polymers are used with embodiments of the present invention. Again, this non-comprehensive list is just representative of the types of polymers that may be used in forming the dispersions and adhesive compositions in accordance with embodiments of the present invention. Those having ordinary skill in the art will recognize that a number of other suitable polymers exist.

In selected embodiments, polymers used in embodiments of the present invention have an $M_w$, value of 300,000 or less (as measured using the GPC system described below). In other embodiments, the polymers have an $M_w$ of 200,000 or less. In yet other embodiments, the polymers have an $M_w$ of 150,000 or less.

Waxes:

Waxes useful in embodiments of the present invention include Fischer-Tropsch waxes, petroleum-derived waxes, and synthetic waxes. These waxes are commercially available, from Sasol company, for example. Large oil companies such as Shell Oil, ExxonMobil, and other oil refiners supply petroleum waxes suitable for use in these applications. Montan waxes are another type of suitable waxes. Most of these waxes are obtained in the process of refining lube oil, where the waxes are separated from the lube oil stock and refined into various fractions of waxes including paraffins and microcrystalline waxes. Formulators such as Astor Wax, IGI, and Moore & Munger also supply waxes suitable for these applications. These waxes are resold as is from the oil companies and/or formulated and repackaged to meet the specific needs of customers.

In addition to synthetic and/or petroleum-derived waxes, a number of other "natural" waxes may be used, such as carnauba waxes, and commercially available high triglyceride waxes derived from the processing of natural oil-containing commodities such as soybeans, palm and other crops, from which oil can be obtained.

Suitable waxes may be obtained from Archer Daniels Midland (Decatur Ill.) designated by their product number 86-197-0; Cargill Incorporated (Wayzata, Minn.) designated by their product number 800mrcs0000u; and other sources under a generic name 'hydrogenated soybean oil'. Palm oil wax may be obtained by Custom Shortenings & Oils (Richmond, Va.) and is designated as Master Chef Stable Flake-P. Soybean wax is also distributed by Marcus Oil and Chemical Corp. (Houston, Tex.) under the designation of "Marcus Nat 155". These waxes can also be used as food additives. In embodiments involving PSAs, the waxes listed above may be replaced with oils (which may be similarly constituted).

Tackifying resins:

Tackifying resins useful in the present invention include aliphatic, cycloaliphatic, and aromatic hydrocarbons and modified hydrocarbons and hydrogenated versions; terpenes and modified terpenes and hydrogenated versions; and rosins and rosin derivatives and hydrogenated versions; and mixtures thereof. These tackifying resins have a ring and ball softening point from 70° C. to 150° C., and will typically have a viscosity at 350° F. (177° C.), as measured using a Brookfield viscometer, of no more than 2000 centipoise. They are also available with differing levels of hydrogenation, or saturation, which is another commonly used term.

Useful examples include Eastotac™ H-100, H-115 and H-130 from Eastman Chemical Co. (Kingsport, Tenn.), especially when incorporated at levels of up to about 15 weight percent of the total composition, which are partially hydrogenated cycloaliphatic petroleum hydrocarbon resins with softening points of 100° C., 115° C. and 130° C., respectively. These are available in the E grade, the R grade, the L grade and the W grade, indicating differing levels of hydrogenation with E being the least hydrogenated and W being the most hydrogenated. The E grade has a bromine number of 15, the R grade a bromine number of 5, the L grade a bromine number of 3, and the W grade a bromine number of 1. Eastotac™ H-142R from Eastman Chemical Co. has a softening point of about 140° C. Other useful tackifying resins include Escorez™ 5300, 5400, and 5637, partially hydrogenated cycloaliphatic petroleum hydrocarbon resins; and Escorez™ 5600, a partially hydrogenated aromatic modified petroleum hydrocarbon resin, which are available from Exxon Chemical Co. (Houston, Tex).; and Wingtack™ Extra, which is an aliphatic, aromatic petroleum hydrocarbon resin available from Goodyear Chemical Co. (Akron, Ohio).

There are numerous types of rosins and modified rosins available with differing levels of hydrogenation including gum rosins, wood rosins, tall-oil rosins, distilled rosins, dimerized rosins, and polymerized rosins. Some specific modified rosins include glycerol and pentaerythritol esters of wood rosins and tall-oil rosins. Commercially available grades include, but are not limited to, Sylvatac™ 1103, a pentaerythritol rosin ester available from Arizona Chemical Co. (Jacksonville, Fla.); Unitac™ R-100 Lite, a pentaerythritol rosin ester available from Union Camp (Wayne, N.J.); Permalyn™ 305, an erythritol modified wood rosin available from Hercules, Inc. (Brunswick, Ga.) and Foral 105, which is a highly hydrogenated pentaerythritol rosin ester also available from Hercules, Inc. (Brunswick, Ga.). Sylvatac™ R-85 and 295 are 85° C. and 95° C. melting point rosin acids available from Arizona Chemical Co. and Foral AX is a 70° C. melting point hydrogenated rosin acid available from Hercules, Inc. Nirez V-2040 is a phenolic modified terpene resin available from Arizona Chemical Co.

Another exemplary tackifier, Piccotac™ 115 available from Eastman Chemical Co., has a viscosity at 350° F. (177° C.) of about 1600 centipoise. Other typical tackifiers have viscosities at 350° F. (177° C.) of much less than 1600 centipoise, for instance, from 50 to 300 centipoise.

Exemplary aliphatic resins include those available under the trade names Eastotac™, Escorez™, Piccotac™, Mercures™, Wingtack™, Hi-Rez™, Quintone™, Tackirol™, etc. Exemplary polyterpene resins include those available under the trade designations Nirez™, Piccolyte™, Wingtack™, Zonarez™, etc. Exemplary hydrogenated resins include those available under the trade names Escorez™, Arkon™, Clearon™, etc. These tackifiers may be employed with the polymers of the present invention, providing they are used at compatible levels.

In certain applications of the present invention, it is anticipated an adhesive may be prepared without the use of a tackifier or with a minimal quantity of tackifier. An adhesive may also prepared without a wax, such as a blend of a polymer and a tackifying resin.

Tackifiers added to adhesives can be characterized by parameters such as their softening points, specific gravities, or by acid number. A tackifier can be selected from among the variety of tackifiers, as described above but not limited thereto, and from tackifiers characterized by a range of acid numbers, such as acid numbers between 0 and 100, more preferably an acid number between 0 and 25.8, and most preferably a tackifier having an acid number between 3-10.

In embodiments of the present invention, the polymer and/or wax, tackifying resin, oil, and dispersing agent typically comprise between about 1 to about 74 volume percent of the total dispersion. Water, therefore, typically comprises between about 26 to 99 volume percent. However, several percent of dispersing agents, additives, biocides, and other compounds as explained below may also be present. All intermediate ranges, e.g., 5 to 50 volume percent polymer/wax/tackifying resin/oil, are included within the scope of the instant disclosure. Specific ranges include 50 to 60 percent polymer and/or wax, tackifying resin, oil, and dispersing agent of the total dispersion.

Dispersing Agent:

Dispersions described herein include a dispersing agent. Any dispersing agent may be used in embodiments of the invention. As used herein the term "dispersing agent" means an agent that aids in the formation and/or the stabilization of a dispersion. Some dispersing agents can also be used to form emulsions and are described in detail by Paul Becher (Emulsions: Theory and Practice, 3rd edition, Oxford University Press, New York, 2001), incorporated herein by reference in its entirety. Dispersing agents generally fall into three classes 1) surface-active materials, 2) naturally occurring materials, and 3) finely divided solids. Surface-active agents, also called surfactants, are materials that reduce the interfacial tension between two immiscible liquid phases. They are classified according to the hydrophilic group in the molecule: anionic, cationic, nonionic, or ampholytic (amphoteric). Examples of commercially available dispersing agents may be found in McCutcheon (McCutcheon's Emulsifiers and Detergents, Glen Rock, N.J., issued annually). Examples of naturally occurring materials include phospholipids, sterols, lanolin, water-soluble gums, alginates, carageenin, and cellulose derivatives. Examples of finely divided solids include basic salts of the metals, carbon black, powdered silica, and various clay (principally bentonite).

In some embodiments, a fatty acid or fatty acid salt is used as the dispersing agent. Typical salts include alkali metal salts or alkaline earth metal salts of the fatty acid. Other salts include ammonium or alkyl ammonium salts of the fatty acid. In some embodiments, the fatty acid or its salt has 12 to fewer than 25 carbon atoms. Where the dispersing agent is a salt, the number of carbons refers to the carbon atoms associated with the fatty acid fragment. In other embodiments, the salt is formed with a fatty acid fragment that has from 15 to 25 carbon atoms. Particular embodiments use an alkali metal salt of erucic acid. Erucic acid is a fatty acid with 22 carbon atoms. Some embodiments use erucic acid in the form of rapeseed oil which is a natural oil that contains approximately 40 to about 50% erucic acid with the remainder consisting of primarily chains having 18 carbon atoms. An alkaline earth metal salt of erucic acid is also useful in some embodiments. In some preferred embodiments, fatty acids containing 16-26 carbon atoms may be used.

In particular embodiments, the salt of a fatty acid containing fewer than 25 carbon atoms is produced by neutralizing a fatty acid containing fewer than 25 carbon atoms or by saponification of an ester of a fatty acid containing fewer than 25 carbon atoms.

Some embodiments of the present invention use a fatty acid or its salt that is derived from an ester of a fatty acid. The alcohol residue constituting such ester may preferably contain 2 to 30 carbon atoms, and most preferably 6 to 20 carbon atoms. Such residue may be either a straight or a branched residue, and may also be a mixture of two or more residues each containing different number of carbon atoms. Exemplary alcohol residues include residues of higher alcohols containing 10 to 20 carbon atoms such as cetyl alcohol, stearyl alcohol, and oleyl alcohol. Some embodiments use an ester of erucic acid.

In other embodiments, the dispersing agent can be an ethylene acrylic acid copolymer. More broadly speaking, the dispersing agent may simply be an acid copolymer. For example, ethylene methacrylic acid is another suitable agent. Still other embodiments use alkyl ether carboxylates as the dispersing agent. In some embodiments, petroleum sulfonates are useful. In other embodiments, the dispersing agent is a sulfonated or polyoxyethylenated alcohol. In still other embodiments, sulfated or phosphated polyoxyethylenated alcohols are suitable. Polymeric ethylene oxide/propylene oxide/ethylene oxide dispersing agents, known as poloxamers may also be used as the dispersing agent. Primary and secondary alcohol ethoxylates are also suitable in some dispersions. Alkyl glycosides and alkyl glycerides are used in some dispersions. Of course, combinations of these dispersing agents are also suitable.

Embodiments of the present invention typically include from about 1 to 30 pph (parts per hundred) dispersing agent based on the total amount of polymer and/or wax, tackifying resin, and oil used. However, larger or smaller amounts may also be used in selected applications. In other embodiments, between 5 to 20 pph of dispersing agent may be used.

Biocides:

Additionally, biocides that enhance biological stability may be used. Those having ordinary skill in the art will recognize that a number of suitable compounds exist. For example, chlorine, quaternary ammonium compounds, and sodium pentachlorophenate are all suitable examples. One particularly useful biocide is sold under the trademark DOWICIL 200, by The Dow Chemical Company (Midland, Mich.). Biocides may be present in a range from about 0 to about 1 weight percent of the total weight.

Additives:

Adhesives of the present invention may also contain a number of additional components, such as a stabilizer, plasticizer, pigment, filler, or antioxidant. Among the applicable stabilizers or antioxidants which can be included in the adhesive composition of the present invention are high molecular weight hindered phenols and multifunctional phenols, such as sulfur-containing and phosphorous-containing phenols. Hindered phenols, known to those skilled in the art, may be described as phenolic compounds, which also contain sterically bulky radicals in close proximity to the phenolic hydroxyl group. Specifically, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity. It is this hindrance that provides the stabilizing properties of these phenolic compounds.

Representative hindered phenols include; but are not limited to: 2,4,6-trialkylated monohydroxy phenols; 1,3,5-trimethyl-2,4,6-tris-(3,5-d-i-tert-butyl-4-hydroxybenzyl)-benzene; pentaerythritol tetrakis-3(3,5-di-tert-butyl-4-hydroxyphenyl)-propionate, commercially available under the trademark IRGANOX$_{(R)}$ 1010; n-octadecyl-3(3,5-di-tert-butyl-4-hydroxyphenyl)-propionate; 4,4'-methylenebis (4-methyl-6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; 2-(n-octylthio)ethyl 3,5-di-tert-butyl-4-hydroxy-benzoate; di-n-octadecyl 3,5-di-tert-butyl-4-hydroxy-benzylphosphonate; and sorbitol hexa(3,3,5-di-tert-butyl-4-hydroxy-phenyl)-propionate.

Antioxidants include, but are not limited to, butylated hydroxy anisole ("BHA") or butylated hydroxy toluene ("BHT") which may also be utilized to render the formulation more thermally stable. These stabilizers and antioxidants may be added in amounts ranging from approximately 0.01% to approximately 5% by weight of the formulation.

Utilizing known synergists in conjunction with the antioxidants may further enhance the performance of these antioxidants. Some of these known synergists are, for example, thiodipropionate esters and phosphates. Chelating agents and metal deactivators, may also be used. Examples of these compounds include ethylenediaminetetraacetic acid ("EDTA"), and more preferably, its salts, and disalicylalpropylenediamine. Distearylthiodipropionate is particularly useful. When added to the adhesive composition, these stabilizers are generally present in amounts of about 0.1 to about 1.5 weight percent, and more preferably in the range of about 0.25 to about 1.0 weight percent.

Other additives known to the adhesive industry may also be used in conjunction with embodiments of the present invention. The scope of the present invention is not intended to be limited to any particular formulation set forth above or below, but instead is governed by the claims.

Other typical additives may include, but are not limited to, nucleating agents, chemicals used to delay crystallization, thickeners, rheology modifiers, antiblocks, oils, and other additives.

As noted above, embodiments of the present invention relate to a selectively activatable adhesive dispersion. To form a selectively activatable dispersion in accordance with a first embodiment of the present invention, a polymer is melted in a hot melt feeder tank set at a temperature sufficient to substantially melt the polymer. The liquid polymer is then fed, at a rate that may be selected depending on the desired processing time, into a heated conduit leading to a mixer. While enroute to the mixer, the liquid polymer may be combined with one or more of the wax, tackifying resin, oil, or other additives set forth above. After arriving at the mixer, the liquid polymer (and other components, if present) are combined with a water/dispersing agent solution, which are typically pre-heated prior to their injection into the mixer. After mixing for a sufficient time, a selectively activatable adhesive dispersion is created. After exiting the mixer, hot water may be added to dilute the mixture to the desired extent. Alternatively, additives may be added to the dispersion after it leaves the mixer.

While any method may be used, one convenient way to prepare the dispersions described herein is melt-kneading. Any melt-kneading means known in the art may be used. In some embodiments a kneader, a Banbury mixer, single-screw extruder, or a multi-screw extruder is used. A process for producing the dispersions in accordance with the present invention is not particularly limited. One preferred process, for example, is a process comprising melt-kneading the above-mentioned components according to U.S. Pat. No. 5,756,659 and U.S. Patent Publication No. 20010011118.

While particular preferred and alternative embodiments have been described herein, it should be noted that various other embodiments and modifications can be made without departing from the scope of the inventions described herein. It is the appended claims which define the scope of the patent issuing from the present application.

What is claimed is:

1. A carpet tile comprising a primary backing material having a face and a back side, a plurality of fibers attached to the primary backing material and extending from the face of the primary backing material and exposed at the back side of the primary backing material, a precoat, an adhesive backing material, an optional dimensional stability layer, an optional cap coat material, and an optional secondary backing material adjacent to the dimensional stability layer or adhesive backing material, wherein, the adhesive backing material is an extruded layer on the precoat, and the extruded adhesive backing layer has a coating weight from 30 ounces per square yard to 80 ounces per square yard and comprises
   at least one olefin block copolymer;
   a tackifier;
   a filler; and
   the extruded adhesive backing layer has a growth tension versus temperature relationship such that the area under the curve for growth tension between 25° C. and 40° C. for an extruded sheet made from the adhesive backing material in the machine direction is 52 (psi-° C.) or less.

2. The carpet tile of claim 1 wherein the olefin block copolymer comprises an ethylene block interpolymer characterized as having an average block index greater than zero and up to about 1.0 and a molecular weight distribution, Mw/Mn, greater than about 1.3.

3. The carpet tile of claim 1 wherein the olefin block copolymer comprises an ethylene block interpolymer characterized as having at least one or more of the following characteristics:
   (a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)^2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein o the numerical values of ΔT and ΔH have the following relationships:

$$\Delta T > -0.1299(\Delta H) + 62.81$$

for ΔH greater than zero and up to 130 J/g, ΔT>48° C. for ΔH greater than 130 J/g, wherein the CRYSTAF peak is determined using at least 5 percent of the cumulative polymer, and if less than 5 percent of the polymer has an identifiable CRYSTAF peak, then the 5 CRYSTAF temperature is 30° C.; or
   (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when the ethylene/α-olefin interpolymer is o substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction 5 eluting between the same temperatures, wherein said comparable random ethylene interpolymer has the same comonomer(s) and a melt index, density, and molar comonomer content (based on the whole polymer) within 10 percent of that of the ethylene/α-olefin interpolymer; or
   (e) is characterized by a storage modulus at 25° C., G' (25° C.), and a storage modulus at 100° C., C(100° C.), wherein the ratio of G'(25° C.) to C(100° C.) is from about 1:1 to about 10:1.

4. The carpet tile of claim 1, wherein the olefin block copolymer is an ethylene based polymer having a comonomer content of a TREF fraction eluting between 40 and 130C greater than or equal to the quantity (−0.2013)T+21.07, where T is the numerical value of the peak elution temperature of the TREF fraction, measured in ° C.

5. The carpet tile of claim 1 wherein (i) the fibers, primary backing, adhesive backing and optional secondary backing all comprise a polyolefin multi-block polymer, (ii) the olefin monomer chemistry of the adhesive backing differs from that of the fibers and the primary backing, and (iii) the carpet includes a label or literature at the time of sale which represents that the carpet is recyclable without segregation of carpet components.

6. The carpet tile of claim 1 wherein the olefin block copolymer is an ethylene based copolymer and wherein the carpet tile has a flex modulus of 20 ksi or less, and wherein the copolymer has a DSC peak temperature of not less than about 110° C.

7. The carpet tile of claim 1 wherein the olefin block copolymer is an ethylene based copolymer and wherein a formulation made for use in the carpet or carpet tile has a growth tension versus temperature relationship such that the area under the curve for growth tension between 25° C. and 40° C. for an extruded sheet made from the composition in the cross direction of 65 (psi-° C.) or less.

8. The carpet tile of claim 6 wherein the ethylene block copolymer comprises from about 60 to about 90 percent by weight filler.

9. The carpet tile of claim 6 wherein the ethylene block copolymer further comprises at least one filler, and has a radiant panel flame propagation of a minimum of 0.4 watts/square centimeter tested in accordance with ASTM E 648.

10. The carpet tile of claim 1 wherein the adhesive backing material further comprises
   (a) the filler in an amount of greater than 0% and up to about 90% by weight based on the total weight of the material, wherein the filler is selected from the group consisting of coal fly ash, ATH, CaCO3, talc, recycled glass, magnesium hydroxide, ground up tires, and ground up carpet,
   (b) optionally, at least one other polymer selected from the group consisting of MAH-g- o HDPE, EEA, and EAA
   (c) optionally, at least one oil,
   (d) optionally, a color additive such as carbon black.

11. The carpet tile of claim 1 wherein the extruded adhesive backing layer comprises at least 60 wt % filler.

12. The carpet tile of claim 1 wherein the extruded adhesive backing layer comprises a maleic anhydride grafted polyethylene.

* * * * *